(12) United States Patent
Blanc et al.

(10) Patent No.: US 12,048,292 B2
(45) Date of Patent: Jul. 30, 2024

(54) FEEDLOT EAR-TAG SYSTEMS AND METHODS

(71) Applicant: AeXonis Holdings Inc., Irving, TX (US)

(72) Inventors: Gilles Alain Georges Blanc, Centennial, CO (US); Rémy André Jean Blanc, Dallas, TX (US); Julien Fernand Lucien Courtat, Villebon sur yvette (FR); Patrick Louis Fiche, Palaiseau (FR); Idomeneas Chorafakis, Toronto (CA)

(73) Assignee: GRYCEPHIE (SARL), Capaellen (LU)

( * ) Notice: Subject to any disclaimer, the term of this patent is extended or adjusted under 35 U.S.C. 154(b) by 170 days.

(21) Appl. No.: 17/587,452

(22) Filed: Jan. 28, 2022

(65) Prior Publication Data
US 2022/0232805 A1      Jul. 28, 2022

Related U.S. Application Data

(60) Provisional application No. 63/142,995, filed on Jan. 28, 2021.

(51) Int. Cl.
| | | |
|---|---|---|
| A01K 29/00 | (2006.01) | |
| A01K 11/00 | (2006.01) | |
| G01S 11/02 | (2010.01) | |

(52) U.S. Cl.
CPC .......... *A01K 29/005* (2013.01); *A01K 11/001* (2013.01); *G01S 11/026* (2013.01)

(58) Field of Classification Search
CPC ... A01K 29/005; A01K 11/001; G01S 11/026; G01S 5/02216; G01S 5/16; G01S 13/765; G01S 2205/01; G01S 13/878
See application file for complete search history.

(56) References Cited

U.S. PATENT DOCUMENTS

| | | |
|---|---|---|
| 7,843,350 B2 | 11/2010 | Geissler et al. |
| 9,826,714 B2 | 11/2017 | Garrity |
| | (Continued) | |

FOREIGN PATENT DOCUMENTS

| | | |
|---|---|---|
| AU | 2018358933 B2 | 1/2020 |
| EP | 2109358 B1 | 3/2019 |
| WO | 2016189524 A1 | 12/2016 |

OTHER PUBLICATIONS

International Search Report and Written Opinion received in Patent Cooperation Treaty Application No. PCT/US22/14326 dated May 3, 2022, 23 pages.

*Primary Examiner* — Daniell L Negron
(74) *Attorney, Agent, or Firm* — Johnston IP Law, PLLC

(57) ABSTRACT

Systems and methods for tracking certain activities of a plurality of animals in a feedlot involve a plurality of RF asset tags attached to the plurality of animals and a plurality of RF detector stations that are operable to read unique identifier codes associated with each of the plurality of RF asset tags. Members of the plurality of RF detector stations are positioned, at least for some, proximate to at least one water trough and at least one feed trough, and are operable to transmit data concerning the RF asset tags detected over a communication link to an asset management subsystem. Duplicate signals may be reduced, signal filtered and smoothed, and energy conserved with certain approaches taken with the RF detector stations. Other systems and devices are presented.

18 Claims, 11 Drawing Sheets

(56) References Cited

U.S. PATENT DOCUMENTS

| | | |
|---|---|---|
| 2010/0030036 A1 | 2/2010 | Mottram et al. |
| 2010/0328030 A1 | 12/2010 | Hill |
| 2012/0089340 A1 | 4/2012 | Huisma |
| 2017/0118961 A1 | 5/2017 | Halachmi et al. |
| 2019/0380311 A1* | 12/2019 | Crouthamel ......... A01K 11/004 |
| 2020/0096599 A1* | 3/2020 | Hewett ................. G07G 1/009 |
| 2020/0137983 A1* | 5/2020 | Nieveen ............... A01K 29/005 |

* cited by examiner

FEEDLOT EAR-TAG SYSTEMS AND METHODS

CROSS-REFERENCE TO RELATED APPLICATION

This application claims the benefit of U.S. Provisional Application Ser. No. 63/142,995, filed by Gilles Alain Georges Blanc, on Jan. 28, 2021, entitled "Feedlot Ear-Tag Systems and Methods," which is incorporated herein by reference in its entirety for all purposes.

TECHNICAL FIELD

This disclosure is directed, in general, to systems and methods for monitoring of eating and drinking by livestock and, more specifically, to such systems and methods in a feedlot environment.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

In many places, the final stage of processing livestock in large scale commercial operations takes place in feedlots, with the goal of increasing the body weight of animals before they are brought to market. In the feedlot stage, a mature group of animals is placed in a high-density and stressful environment, which significantly increases the potential for health complications. As such, special attention is given to animal health, activity, water intake and diet. Improvements in methods and devices for caring for the livestock are desired.

SUMMARY

According to an illustrative embodiment, a feedlot asset-tag system for monitoring a plurality of animals in a confined space having at least one water trough and at least one feed trough, includes a plurality of RF asset tags attached to the plurality of animals. Each of the plurality of RF asset tags includes a non-volatile memory having a unique identifier code that is transmitted when the RF asset tag is energized by a radio signal. The system further includes a plurality of RF detector stations. At least one of the plurality of RF detector stations is positioned at least within 10 meters of the at least one water trough, and at least one of the plurality of RF detector stations is positioned within 10 meters of the at least one feed trough. Each RF detector is configured to transmit a radio signal to any of the plurality of RF asset tags within a detection zone for that RF detector and receive a returned signal with the unique identifier code. Each of the plurality of RF detectors has a detector-station processor and a detector-station memory, which is a non-transitory memory, for executing programmed code.

The system also includes an asset management subsystem including a management processor and management memory. The management memory is a non-transitory memory. The system also includes a communication link for communicating signals from the plurality of RF detector stations and to the asset management subsystem. For each of the plurality RF detector stations, the detector-station processor and the detector-station memory include programming to receive a returned signal with the unique identifier code from any RF asset tags in its detection zone and transmit the unique identifier code using the communication link to the asset management subsystem.

According to another illustrative embodiment, a method for monitoring the activity of a plurality of livestock in a feedlot includes attaching a plurality of RFID asset tags to the plurality of livestock to be monitored, each RFID asset tag having a unique identifier that is transmitted in response to an energizing signal from a detector station. The method further includes positioning a plurality of detector stations in the feedlot, each detector station having an RF reader. At least one of the plurality of detector stations is positioned proximate to at least one water trough, and at least one of the plurality of detector stations is positioned proximate to at least one feed trough. Each of the plurality of detector stations includes a detector-station processor and a detector-station memory. Each detector station of the plurality of detector stations has a detection zone in which the detector station can read RF asset tags.

The method also includes providing a gateway that receives signals from the plurality of detector stations, and providing an asset managing management system that includes a management processor and management memory. The asset management system receives signals from the gateway over a network. The method further includes recording detection events for each detector station of the plurality of detector stations and determining the location of each detection event; transmitting detection event data to the asset management system; and recording time intervals that each RF asset tag is in a water trough zone for the at least one water trough or a feed trough zone for the at least one feed trough.

According to still another illustrative embodiment, a feedlot asset-tag system for developing data concerning a plurality of animals in a confined space having at least one water trough and at least one feed trough includes a plurality of RF asset tags attached to the plurality of animals. Each of the plurality of RF asset tags includes a non-volatile memory having a unique identifier code that can be transmitted when the RF asset tag is energized by a radio signal. The system also includes a plurality of RF detector stations. At least one of the plurality of RF detector stations is positioned at least within 3 meters of the at least one water trough, and at least one of the plurality of RF detector stations is positioned within 3 meters of the at least one feed trough. The RF detector is configured to transmit a radio signal to any of the plurality of RF asset tags within a detection zone for that RF detector and receive a returned signal with the unique identifier code. Each of the plurality of RF detectors has a detector-station processor and a detector-station memory, which is a non-transitory memory, for executing programmed code.

The system further includes an asset management subsystem that includes a management processor and management memory. The management memory is a non-transitory memory. The system also has a communication link for receiving transmitted signals from the plurality of RF detector stations and delivering the transmitted signal to the asset management subsystem. For each of the plurality RF detector stations, the detector-station processor and the detector-station memory include programming to receive a returned signal with the unique identifier code from any RF asset tags in its detection zone and transmit the unique identifier code using the communication link to the asset management subsystem. The detector-station memory includes stored instructions, which when executed by the detector-station processor, cause the detector-station processor to only transmit detections of RF asset tag detections above a detection threshold for a given time period. Adjacent members of the plurality of RF detector stations communicate with one another and only send one signal with data over the communication link to the asset management subsystem to save energy for one of the adjacent members. Each of the plurality of RF detector stations includes a synchronization clock, and the plurality of RF detector stations are programmed to transmit at unique times to avoid interference. The system also includes a gateway, and the communication link includes a wireless communication to the gateway and wireless communication from the gateway to the asset management subsystem.

DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
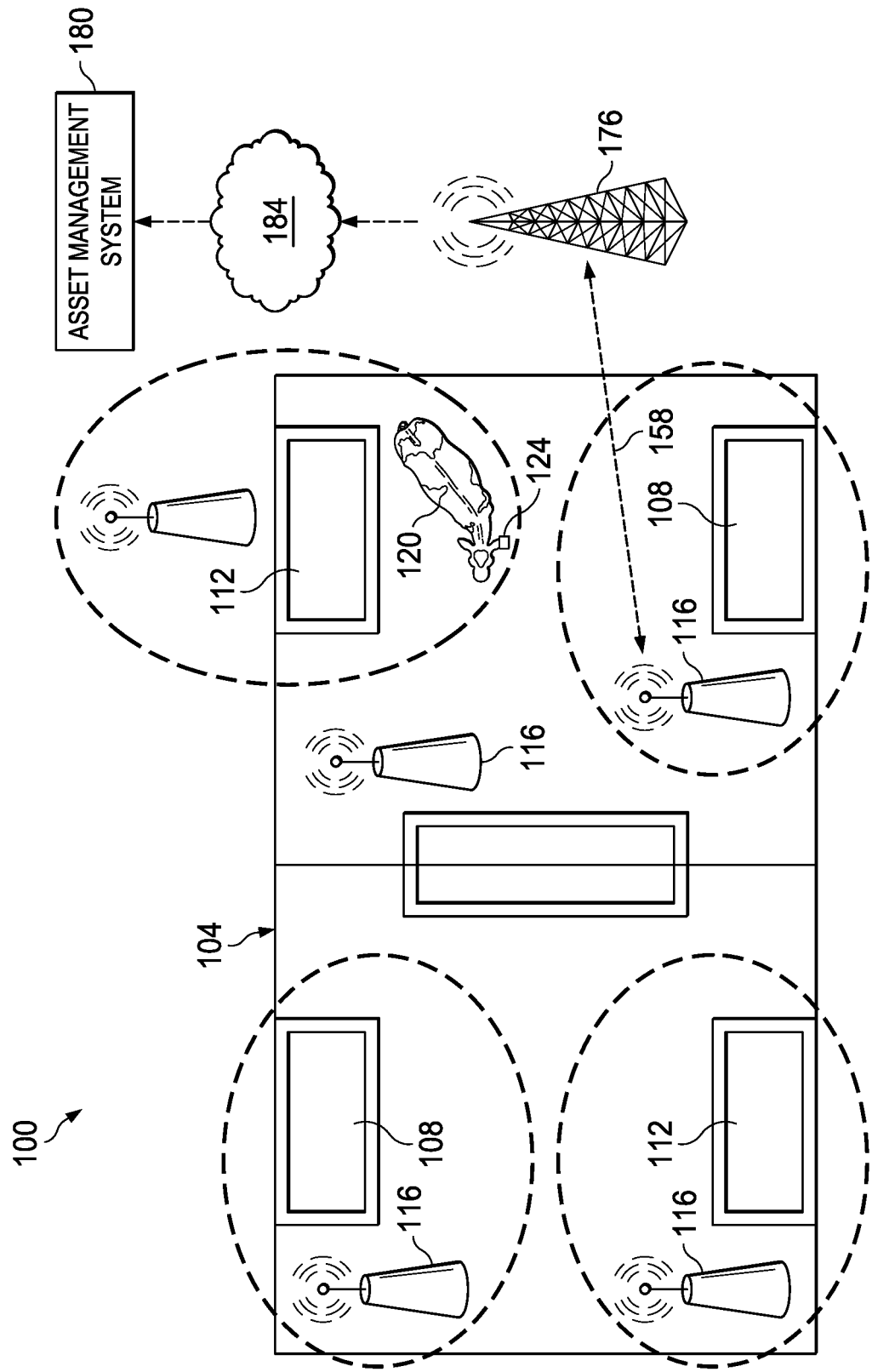
FIG. 1 is a schematic diagram of an illustrative embodiment of a system for monitoring the activities of livestock in a feedlot or other setting.

In the following detailed description, reference is made to the accompanying drawings that form a part hereof, and in which is shown, by way of illustration, specific embodiments in which the invention may be practiced. These embodiments are described in sufficient detail to enable those skilled in the art to practice the inventions, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present inventions are defined only by the claims. Unless otherwise indicated, as used throughout this document, "or" does not require mutual exclusivity.

Livestock in large-scale, commercial feedlots are often grouped within a number of individual adjacent feedlots. Each feedlot includes food troughs, which are where the animals eat, and water troughs, which are where the animals drink. These may be entirely contained within a single feedlot enclosure or shared between adjacent feedlot enclosures. In one illustrative embodiment, a system for monitoring livestock in a feedlot includes using passive RF asset tags that are affixed to the livestock, e.g., cattle. Such passive RF asset tags do not require batteries, are light weight, easy to affix to the livestock, and are of low-cost construction.

Situated at the vicinity of the feed and water troughs are RF tag detectors. The detectors emit a localized RF signal which energize the passive RF tags, or cattle tags, within the immediate area of the detector (e.g., within a few meters). Signals from the energized RF asset tags of nearby livestock are recorded to track each cow's or other animal's position, movement in the vicinity of the detector, or other positioned-based data. A multiplicity of such detectors is applied to collectively track each animal's movement to determine where and when the animal eats or drinks, and for how long. This information is analyzed and communicated in an efficient manner by the detectors, and in a manner as to conserve detector battery energy in some embodiments, to a wireless gateway situated near the feedlots. The gateway sends the assimilated data from the detectors to a central server or data system for further processing and reporting.

In one illustrative embodiment, the systems and methods aim to provide a low-cost, easy-to-deploy system for the monitoring of cattle as the animals move through feedlots. Careful monitoring of the behavior of cattle while in the feedlot is important for the animals' wellbeing, as well as to assure efficient, cost saving operations in the preparation of the cattle for market.

In one illustrative embodiment, a system is provided that constitutes a departure from other systems that use wireless RF technology for active and passive tags that pertain to the monitoring of cattle in grazing fields of thousands of acres in area. Such situations require the use of cattle-mounted active tags containing batteries of sufficient capacity to power the tags' built-in radio transceivers, GPS, and other sensors that may be included in the tags. The batteries can be costly and may not be commercially desirable. Moreover, network coverage over large areas is likewise costly, and relies on satellite, cellular, or emerging long-range, low-power (e.g., LoRA) wireless services. By contrast, an illustrative system hereunder makes use of low-cost passive RF asset tags that do not require batteries. These tags typically cost below $5 per piece at the present time. Likewise, the close radio coverage of the detectors makes them low cost to manufacture and operate, even if battery powered.

Through the use of passive radio frequency RFID asset tags affixed to the livestock, e.g., cattle, and RF detector-relay assemblies situated at desired points within the feedlot or other space, the trajectory of each animal in the feedlot is passively tracked to ascertain the location and time that the animal eats, drinks, and engages in other behavior. The detector-relay assemblies also contain one or more processors, e.g., a microcomputer, to determine the cattle trajectories within the feedlot, and to reduce the amount of data transmitted to a central management system, thereby conserving spectral resources (to prevent signal collisions) and battery power of the detector-relays.

For the purposes of this disclosure, the term "cattle" refers, in general, to bovine livestock. An individual animal in a population of cattle may be referred to as an "animal" or "cow," the latter term without regards to the sex of the animal. However, this disclosure is not restricted to cattle, but apply to other forms of livestock that make use of feedlots, including pigs, sheep, bison, and other animals sold to market as food. The systems and methods may be used to monitor various types of animals in other context or settings, e.g., in zoos, veterinary clinics, pet breeding, dog boarding, etc.

Referring now to the figures, and initially to FIG. 1, an illustrative embodiment of an overall system 100 is presented. The system 100 may be used with many animals and in many contexts as previously referenced, but is presented in this illustration within the feedlot stage of an overall cattle processing operation. A feedlot 104 is a confined area, accessible to the animal via gates, that contains a plurality of feed troughs 108, a plurality of water troughs 112, barriers, and other means to manage the preparation of cattle for market. Within each feedlot 104 are a plurality of detectors 116, typically mounted in the vicinity of each feed trough 108 and water trough 112. When an animal 120, e.g., a cow, approaches a trough 108 or 112, the nearby detector station 116 senses presence of the animal's asset tag 124, e.g., passive RF tag in its ear. The wireless sensing is recorded by one or multiple nearby detector stations 116 and transmitted to a gateway 176 and on to an asset management system (or subsystem) 180, which includes a management processor and a management memory.

Figure 2:
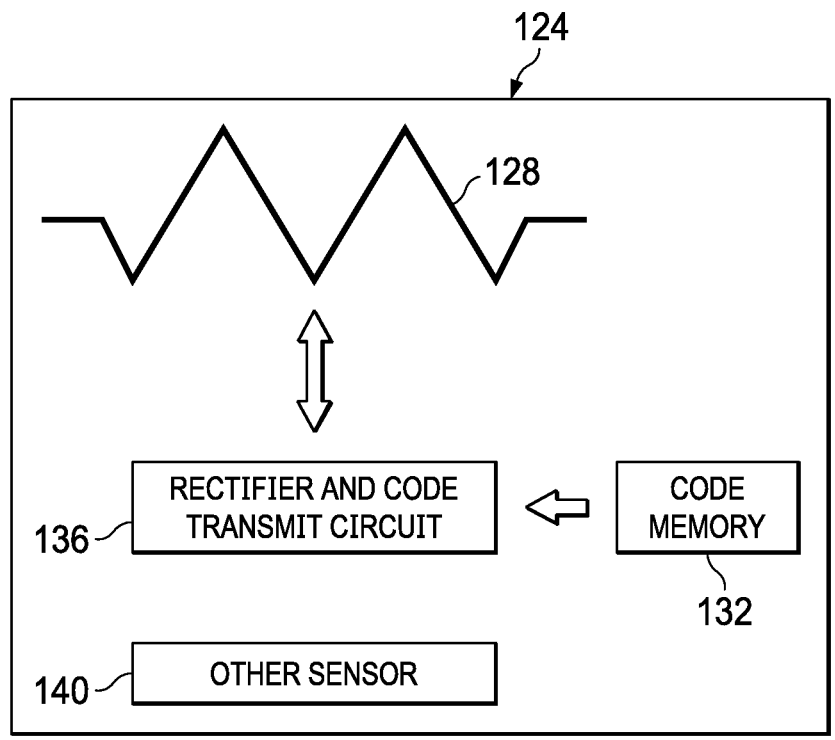
FIG. 2 is a schematic diagram of an illustrative embodiment of an asset tag (or RFID tag or passive tag)

Referring now primarily to FIGS. 1 and 2, an illustrative asset tag in the form of an "RFID" asset tag 124 or "RF tag" or "asset tag" is presented. The RF tag 124 is a passive tag device that is typically mounted on the ear of the livestock, but may be mounted elsewhere, e.g., affixed to a collar or other device worn by the animal, or embedded within the body of the animal. By "passive" it is to be understood that the tag 124 contains no replaceable or rechargeable battery, and that the RF tag 105 is powered by a tuned radio wave that is emitted by a detector, e.g., detector station 116, nearby (within typically 10 m) of the RF tag 124.

Any RFID tag may be used in the applications herein as the asset tag 124. Some examples include near field communication (NFC) tags, low-frequency RFID tags, ultra-high-frequency (UHF) tags, or others. In general terms, RFID technology uses radio waves to send and receive information between a passive tag and an RF reader that may be part of a detection station. Unique information, e.g., an identification code, can be programmed into each individual tag to allow tracking and identification of that tag. While passive tags are preferred, other embodiments may include active tags, i.e., ones that includes batteries.

Referring primarily to FIG. 2, in one illustrative embodiment, each RF asset tag 124 contains an antenna 128, nonvolatile (or non-transitory) memory 132 (or asset-tag memory), and a rectifier and transmit circuit 136.

The nonvolatile, or non-transitory, memory 132, which could take the form of solid-state memory or continuity traces or any other suitable memory (see below for other examples of memory), provides a unique serial number or code for a given asset tag 124. This serial number is programmed into the asset tag 124 prior to its deployment, or may be programmed again when the asset tag 124 is recycled for use on a different animal. Additional components can be included in the asset tag 124, such as a micromechanical accelerometer 140, provided that the power consumption of such a device is within the power budget of the energy delivery to the asset tag 124 from the reader or detector station 116. Those skilled in the art will appreciate the function and variations available in the RFID asset tag 124.

Figure 3:
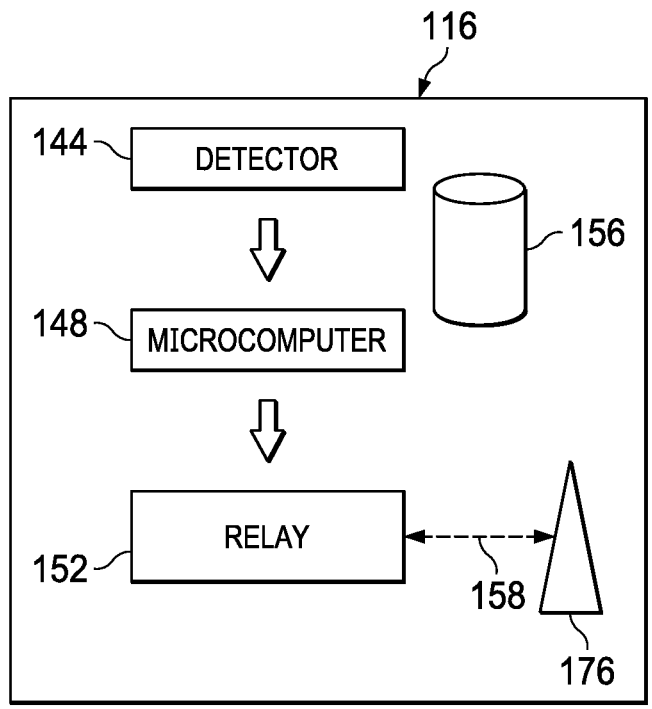
FIG. 3 is a schematic diagram of an illustrative embodiment of a detector station for detecting an asset tag.

Referring now primarily to FIGS. 1 and 3, an illustrative embodiment of a detector station 116 is presented. The detector station 116 is a self-contained device mounted in the vicinity of the water trough 112 or feeding trough 108 of the feedlot 104. A plurality of detector stations 116 are deployed in the feedlot 104. Each detector station 116 is typically mounted within the range of 0 to 12 meters of the applicable trough 108, 112. The detector station 116 contains a passive tag reader or detector (the "detector") 144, a processor and non-transitory memory (e.g., microcomputer 14), and a relay 152.

In one illustrative embodiment, the detection station's 116 detector 144 is a passive RFID tag reader that emits a tuned radio wave that powers the RF asset tags 124 that fall within the detector's 144 range of communications or detection zone. A detection of such an asset tag 124 occurs whenever the asset tag 124 borne by an animal 120, e.g., cow, becomes sufficiently close to the detector station 116 (nominally within 10 m). In some embodiments, detection occurs in the range of 0-12 meters. When this radio wave impinges on the tag 124, an antenna 128 (FIG. 2) built into the asset tag 124 captures the incoming radio wave and converts the radio wave's energy to direct current (DC) voltage to power an on-board transmitter, memory, and possibly other devices or sensors 140, such as an accelerometer. The detector station's detector 144 reads a unique identification code, ID, stored within the RF asset tag 124 of a given animal 120 to enable the unique tracking of the movement and habits of the animal 120 (e.g., cow).

Referring still primarily to FIG. 3, in one illustrative embodiment, the detector station 116 includes a power source 156, which is a battery (or other source of energy) suitable for outdoor usage and may include environmental recharging components such as solar or wind generators. The detector station 116 further includes the asset tag detector 144, or passive tag reader, which is the component that detects the proximity and motion vector of an asset tag 124.

Figure 4A:
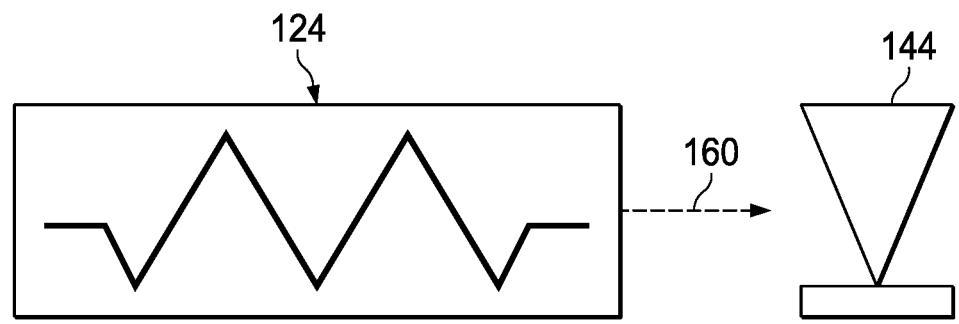
FIG. 4A is a schematic diagram of a portion of an illustrative embodiment of a system for monitoring the activities of livestock in a feedlot or other setting.
Figure 4B:
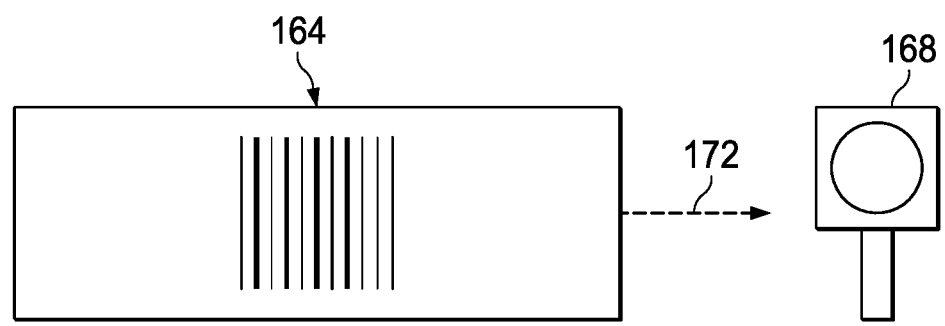
FIG. 4B is a schematic diagram of a portion of an illustrative embodiment of a system for monitoring the activities of livestock in a feedlot or other setting showing an alternative tag that is a visible bar code.

Referring now primarily to FIGS. 4A and 4B, an alternative illustrative embodiment of an aspect of the system 100 is presented. In this embodiment, in lieu of an RF passive asset tag 124 (FIG. 4A), other passive tag technologies are used as suggested in FIG. 4B. In FIG. 4A, the RF receiver assembly within a passive RF tag 124 has an RF link 160 to an RF detector 144 in a detection station. In the alternative design of FIG. 4B, the RF asset tag 124 is replaced with a visible bar code 164, or QR code or other visual indicia, on a tag whereby the detector station 116 (FIG. 1) is equipped with a camera 168, or cameras in lieu of an RF detector/read circuit 144. The camera(s) in detector station 116 detects and visually reads 172 such visible codes 164. As in the RF tag case, the codes imprinted on the tag would be unique to the asset tag, hence the animal wearing the tag.

Referring again primarily to FIG. 3, the detector station 116 also contains a processor (or detector station processor) and memory (or detector station memory), e.g., a microcomputer 148, which assimilates the movement information from the RF asset tags 124 that the detection station 116 encounters, as well as other tracking artifacts from animal movement. The microcomputer 148 includes non-volatile memory (or detector station memory) for holding programming for certain tasks. As discussed below, the microcomputer 148 may also reduce the data transmitted by the relay 152 to the gateway 176 (FIG. 1) to conserve spectrum and detector station battery energy. Depending on the proximity detection technology and receive range of the detector 144, there may be one or more detector stations 116 set up along the feeding troughs 108 and water troughs 112.

The relay 152 within the detector station 116 receives events from the detector station's detector 144 as process and such events from the detectors of other detection stations 116. After processing by the detector station's microcomputer 148, the relay 152 of each detector station 116 transmits the processed position, movement, and behavior information to the gateway 176 typically using available wireless communication mechanisms including, but not limited to, LoRa, BLE, WiFi, ethernet, etc., and then to an asset management system 180 using a wired or wireless communication generally referenced as network 184.

Due to the nature of the feedlot environment, in many cases it may be desirable to deploy a plurality of detector stations 116 across a relatively large geographic area without access to an AC power source or other hard-wired power source. The detector station power source 156 (FIG. 3) may therefore be a battery that can operate in an outdoor environment and may use recharging technologies such as solar or wind to recharge the batteries. The power source 156 may include several hot-swappable batteries to facilitate field maintenance and upgrades without impacting the detector station's 116 operational state. If stable AC power or other power is available, the available power may be used as the power source 156 for detector stations.

The detector station 116 receives and processes proximity and motion data from any asset tag 124 that is within its field of operation (or vicinity or detection zone) of the detector 144. The detectors 144 in a plurality of detector stations 116 may work in tandem to correlate data from detected asset tags 124 in order to determine the precise location of an asset tag 124, as described elsewhere in this disclosure. The detector 144 is able to collect information from each asset tag 124 within the detector's receive zone, or detection zone, such that the collected information can be used by algorithms and analytics operating on a processor with associated memory, e.g., a microcomputer within the detection station 116, and in the remote server of the asset management system 180 (FIG. 1), to make accurate deductions about the eating and drinking behaviors of each individual animal 120. The detector station 116 includes a clock for timing aspects of the data collection. The specific information that is collected by the detector 144 and made available to other components varies depending on the specific embodiment of other components such as the asset tag 124, proximity sensing technology, motion sensing technology, etc. as one skilled in the art will appreciate. The information that may be sent or processed to determine may include for different time intervals the total eating time, total drinking time, movements, current estimated location, time of day, eating/drinking habits, socialization habits such as proximity to other animals, etc. In addition, additional sensors or data may be recorded for the same time periods, such as, weather conditions, including temperature, humidity, and precipitation. The number of drinking or eating periods may be recorded as well; for example, an animal may drink five minutes and then not be detected for 15 minutes before being detected again whereby a second drinking period is established.

The relay component 152 (FIG. 3) within a detector station 116 may be used for transferring information (the relay signals) from the detector station 116 back to the asset management system 180 using a communication link 158 (FIGS. 1 and 3) to the intermediary gateway 176, which provides backhaul networking connectivity 184 to the asset management system 180. Typically, the communication link 158 is wireless, but in some embodiments could be wired. The relay signals are the communication between the detector station 116 and the gateway 176. In some instances, "communication link" may be used to reference the first link 158 and the link from the gateway 176 to the asset management system 180 regardless of whether wired or wireless or what is used for the linkage. Similar to the detection signals, one skilled in the art will appreciate that when RF technology such as LoRa or BLE is used, RF engineering principles may be employed to ensure efficient and effective use of the wireless medium.

Since temporary communication issues may be caused by outages or interference events such as large trucks or other obstacles in the feedlot that impact RF signals, the relay implements store-and-forward logic to ensure that information is reliably communicated back to the asset management system 180 through an available gateway 176. The system 100 may include signals from the asset management subsystem 180 back to a transmitting detector station to acknowledge receipt of information; if not received in a certain time frame, the information may be retransmitted until a receipt is acknowledge. Those skilled in the art will appreciate that many store-and-forward logic approaches may be used.

The wireless gateway 176 provides the interconnection between each detection station's 116 relay 152 and a remote server (not explicitly shown) that operates the asset management system 180. The backhaul connectivity 184, or network, between the gateway 176 and the asset management system 180 may be fixed or wireless using proprietary or standard telecommunications infrastructure, e.g., LTE, 5G, cable, fiber, etc.

Figure 14:
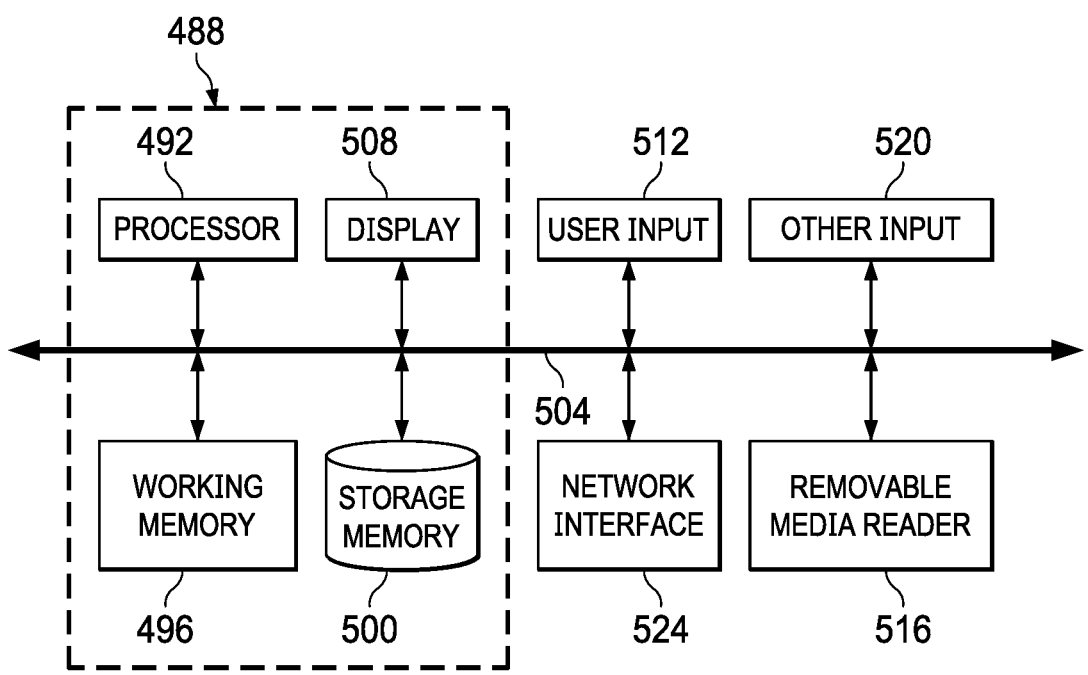
FIG. 14 is a schematic representation of a representative example of hardware components of a programmable computer that may be used for an asset management system or other aspect of a system for monitoring the activities of livestock in a feedlot or other setting.

The asset management system 180 takes in data from the detector stations 116 from a multitude of asset tags 124 and analyzes the data for cattle movement and feeding/drinking within one or more feedlots 104. This system 100 monitors the status of the cattle movement, drinking, and eating within the covered feedlots, and provides real-time or periodic reports on the cattle movement, drinking, eating and behavior. Reports are transmitted via fixed or wireless communications services to smartphones, computers, tablets and other consumer-level devices held by the operators and owners of cattle ranches, feedlots, or other facilities. One asset management system 180 can be shared by multiple operators of feedlots, or owned and operated by individual feedlot owners/operators. The asset management system 180 may include programmable instructions that monitor the data and highlight or provide alerts for data outside of any desired, predefined ranges. Suitable hardware that may be used with the asset management system 180 is shown in FIG. 14 further below as well as components that may be used in other aspects.

In operation of one illustrative embodiment, an illustrative system for monitoring animals 120 within a feedlot 104 identifies when an asset tag 124 (and therefore an animal) is within close proximity of a feed trough 108 or water trough 112, and uses such trough proximity data and in some instances other available information to deduce with a high degree of confidence that the animal 106 is eating or drinking at the food trough 108 or water trough 112.

The primary information emitted by any asset tag 124 is the asset tag identification. Another form of information is the position of the asset tag 124 within the feedlot 104. The position can be determined by a number of approaches. In one example, the position is determined using simply the proximity to the closest detector station 116, as determined by which detector station 116 has detected the asset tag 124 within its operating range. In another illustrative embodiment, the position is determined using signal-level detection (e.g., RSSI level). This approach considers the strength of returned signal to the detector station. In still another example, the position is determined using time differences of arrival methods coordinating among a multiplicity of three or more detector stations 116. TDOA or time difference of arrival may be used for triangulation. In yet another example, the position is determined using angle of arrival method coordinating among a multiplicity of two or more detector stations 116. The vector of the animal is used. As still one more approach, other embodiments may use active tags to support GPS and other geolocation techniques that simply transmit location directly from the tag. Regardless of technique, the position information can be used to determine whether an asset tag 124 (and therefore the animal) is in close enough proximity to a feed trough 108 or water trough 112 to be eating or drinking, respectively. See, for example, the process presented in connection with FIG. 13 below.

Additional information, in the form of a motion vector, is generated by motion of the asset tag 124 relative to one or more detector stations 116. The motion vector provides information about the direction, speed, and possibly acceleration of an asset tag 124. This information can be used to determine whether an animal is (or was recently) walking towards, away from, or in parallel to a trough 108, 112. The elements of the motion vector (direction, speed, acceleration) may be determined by comparing the asset tag data at nearby detector stations 116 over intervals of time. Such comparisons can make use of proximity information (i.e., when only one detector station 116 can receive a close-range asset tag 124), multilateralization across multiple detector stations 116, comparison of RSSI signal levels, etc.

More information can be contained in the movement characteristics of the animal 106, even while it is in a non-changing position. In one illustrative embodiment, readings from a chip-scale accelerometer, or micromechanical accelerometer, that is built into the asset tag 124 as an additional sensor 140 (FIG. 2) may be used, even when the asset tag 124 is running as a passive device. Accelerometer readings can indicate the head motion of the animal, thereby providing a more accurate assessment as to whether the animal is drinking, eating, or engaging in other behavior (e.g., sleep).

By combining one or more forms of information (position and motion) and performing analysis over time, the system 100 can support the accurate predictions about whether an animal 106 is properly eating or drinking. A simple heuristic example could be expressed as follows: A first asset tag 124 first moves 10 meters from its original position near the center of the feedlot 104 towards the feed trough 108 in 8 seconds, ending at a position that is within 10 cm of the feed trough 108. The asset tag 124 remains in that location for 5 minutes. This motion and position characteristic is consistent with that of an animal 120 that is eating. Another example is as follows: an asset tag 124 moves 3 meters from its original position, which was next to the food trough 108, in a direction away from the food trough 108 at an angle of 45 degrees. The asset tag 124 has not been in the vicinity of the food trough 108 for the last minute, and the motion characteristic is consistent with that of an animal that is walking and not eating. In each instance, the data may be transmitted and analyzed.

The passive asset tags 124, such as passive RFID tags, do not contain an internal power source or active electronic components, but rely on an external stimulus, such as the RF energy supplied by an RFID reader 144 to generate the RFID asset tag backscatter signal. The movement situations described above can be tracked with passive asset tags given that such tags can yield useful proximity information for the detection stations 116. An illustrative example is presented in connection with FIG. 5.

Figure 5:
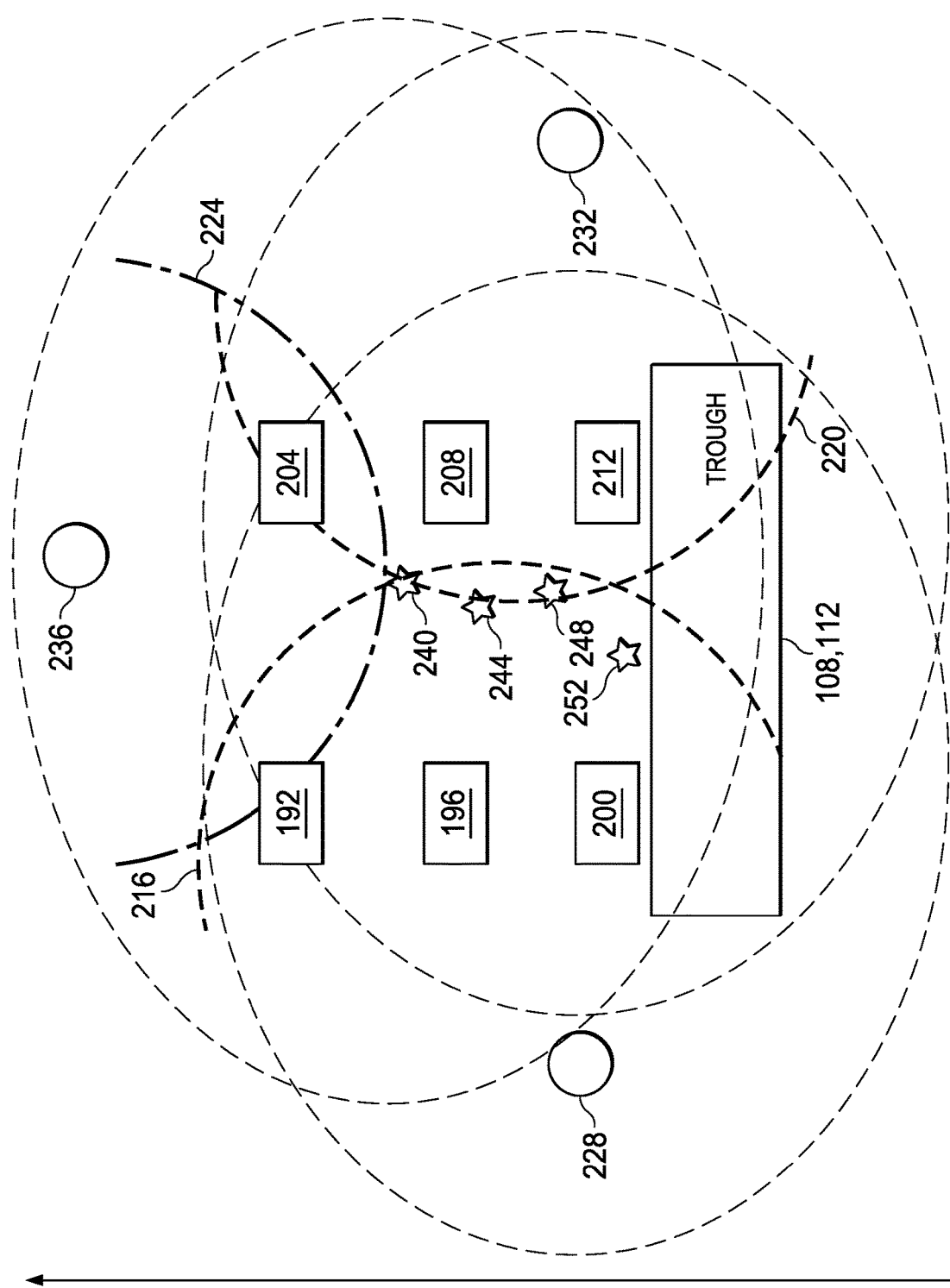
FIG. 5 is a schematic diagram of a portion of an illustrative embodiment of a system for monitoring the activities of livestock in a feedlot or other setting showing overlapping coverage of detector stations.

Referring primarily to FIG. 5, a number of stationary reference asset tags 192, 196, 200, 204, 208, 212, which are distributed at known positions within the detection fields 215, 219, 223 of three RFID readers or stations 228, 232, and 236, are shown. The detection fields 216, 220, 224 are shown as dotted arcs but would typically be circular or elliptical patterns about each station 228, 232, 236. Using the RSSI values from the reference asset tags 192, 196, 200, 204, 208, 212 distributed within its RFID detection fields 216, 220, 224, each detector station 116 is able to form a logical mapping between the RSSI readouts from the reference asset tags 192, 196, 200, 204, 208, 212 and the distance between the detection stations 228, 232, 236 and the reference asset tags 192, 196, 20, 204, 208, 212. The degree of accuracy and the overall robustness of the system 100 is increased as the number of reference asset tags 192, 196, 200, 204, 208, 212 and the number of detection stations 116 are increased. The reference tags may be used during calibration or in some embodiment may be permanently maintained in the detection fields 215, 219, 223.

When each of the detector stations 228, 232, 236 in the above example receive the backscatter signal from a particular asset tag, the RSSI is converted into a distance measurement, or range, using the readings from the reference asset tags 192, 196, 200, 204, 208, 212 as a baseline. The distance measurements from each of the detectors 228, 232, 236 are then correlated to determine the specific X and Y coordinates of the particular asset tag 124 in question. This is illustrated in FIG. 5 by showing the intersection of the three radii 216, 220, 224 for a particular asset tag at time $t_0$ showing position 240.

In that example, the location 240 may be determined by knowing the range for each station 228, 236, 232 and finding the intersection of the three range-based arcs 216, 220, 224. In another embodiment, the stations 228, 236, 232 may determine a range and bearing and average the resultant location data or use a best fit for the three stations 228, 236, 232. By repeating one or more of these location approaches over time, a motion vector for a particular asset tag is constructed and its motion path determined as illustrated by the points in time $t_0$, $t_1$, $t_2$ and $t_3$ and the corresponding positions 240, 244, 248, 252.

Figure 6:
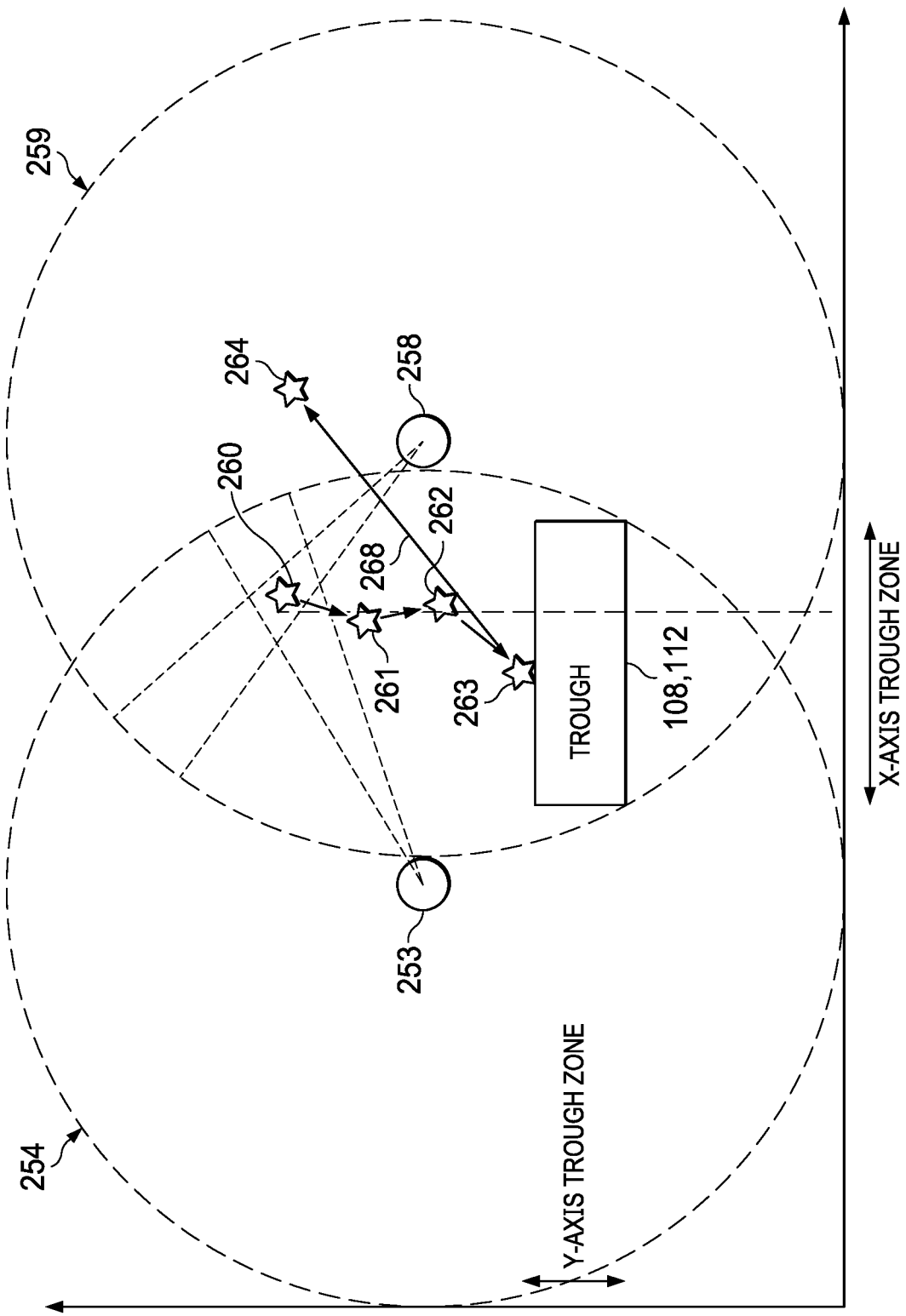
FIG. 6 is a schematic diagram of a portion of an illustrative embodiment of a system for monitoring the activities of livestock in a feedlot or other setting showing overlapping coverage of detector stations and showing illustrative movement of an asset tag.

Referring now primarily to FIG. 6, another illustrative embodiment is presented that includes a first detector 253 having a detection zone 254 and a second detector 258 having a detection zone 259. As before, the location of a particular asset tag at successive location calculations, e.g., at times $t_0$, $t_1$, $t_2$, $t_3$, and $t_4$, may be located as positions 260, 261, 262, 263, 264. The positions 260, 261, 262, 263, 264 over time may be used to calculate motion vectors that show the path of the asset tag towards or away from the trough 108, 112. In this example, the asset tag is shown moving towards the trough 108, 112 between to and $t_1$ (i.e., between position 260 to position 261) and again moving toward the trough 108, 112 between time $t_1$ and $t_2$ (i.e., between positions 261 and 262). Between time $t_2$ and $t_3$ (i.e., between positions 262 and 263) the movement is still toward the trough 108, 112. The position 263 at $t_3$ is at the trough 108, 112.

The movement from $t_3$ to $t_4$ (i.e., from 263 to 264) is away from the troughs 108, 112. Again, at time $t_3$ (location 263), the X and Y coordinates fall within the X-axis trough zone and Y-axis trough zone respectively, which results in the declaration of a "feeding start" event. At time $t_4$ (location 264), the asset tag 264 has moved outside of the Y-axis trough zone and X-axis zone, and the motion vector 268 indicates movement away from the trough 108, 112. These conditions are used to declare a "feeding end" event at position 263.

Note that while the use of RSSI with reference tags (see 192, 196, 200, 204, 208, 212 in FIG. 5) was described as a method used to calculate the position of an asset tag above, other location tracking approaches suitable for passive asset tags may be used. As another example, in FIG. 6, the bearing for each station 253, 258 may be used to determine the location as suggested for the asset tag at position 260. In some embodiment, each detection station 116 may determine range and bearing and therefore have redundant data from the other station that can be processed to avoid sending both to the gateway as suggested further below. The location tracking methods can be combined with machine learning to determine the asset tag positions over time, where the machine learning is trained by the known positions of the reference tags described above.

In scenarios where multiple detectors from multiple detector stations are deployed to cover a particular area, there can be overlap in the detection zones of adjacent detector stations. While this overlap can be desirable—such as for purposes of multilateralization or other positioning algorithms—there may be side-effects of zone overlap depending on the detection technology that is used. For example, with RFID based detection, there may be interference between the RF signal from an adjacent detector and the backscatter signal from an asset tag on an animal within the overlapping zone. One may mitigate interference in such scenarios by varying the frequency between adjacent detectors, using collision avoidance/detection techniques such as time-slicing and staggering RFID carrier signal transmission for adjacent antennas, and employing error correction to improve the ratio of successful message reception. The use of such techniques to mitigate interference between adjacent asset tags and detection stations may be included in the illustrative embodiments herein.

To conserve spectrum and battery drain within the detector stations 116 (when the detector stations are powered by batteries instead of power lines), data reduction methods may be employed that limit the amount of data transmitted between the detector stations 116 and gateway(s) 176. As an illustrative example of data reduction, the detector stations 116 may not forward each individual detection back to the asset management system 180, but rather provide interval-based statistical reports. As an example of the interval-based statistical report, the data may be sent every one minute, two minutes, five minutes, ten minutes, or some other interval.

Figure 7:
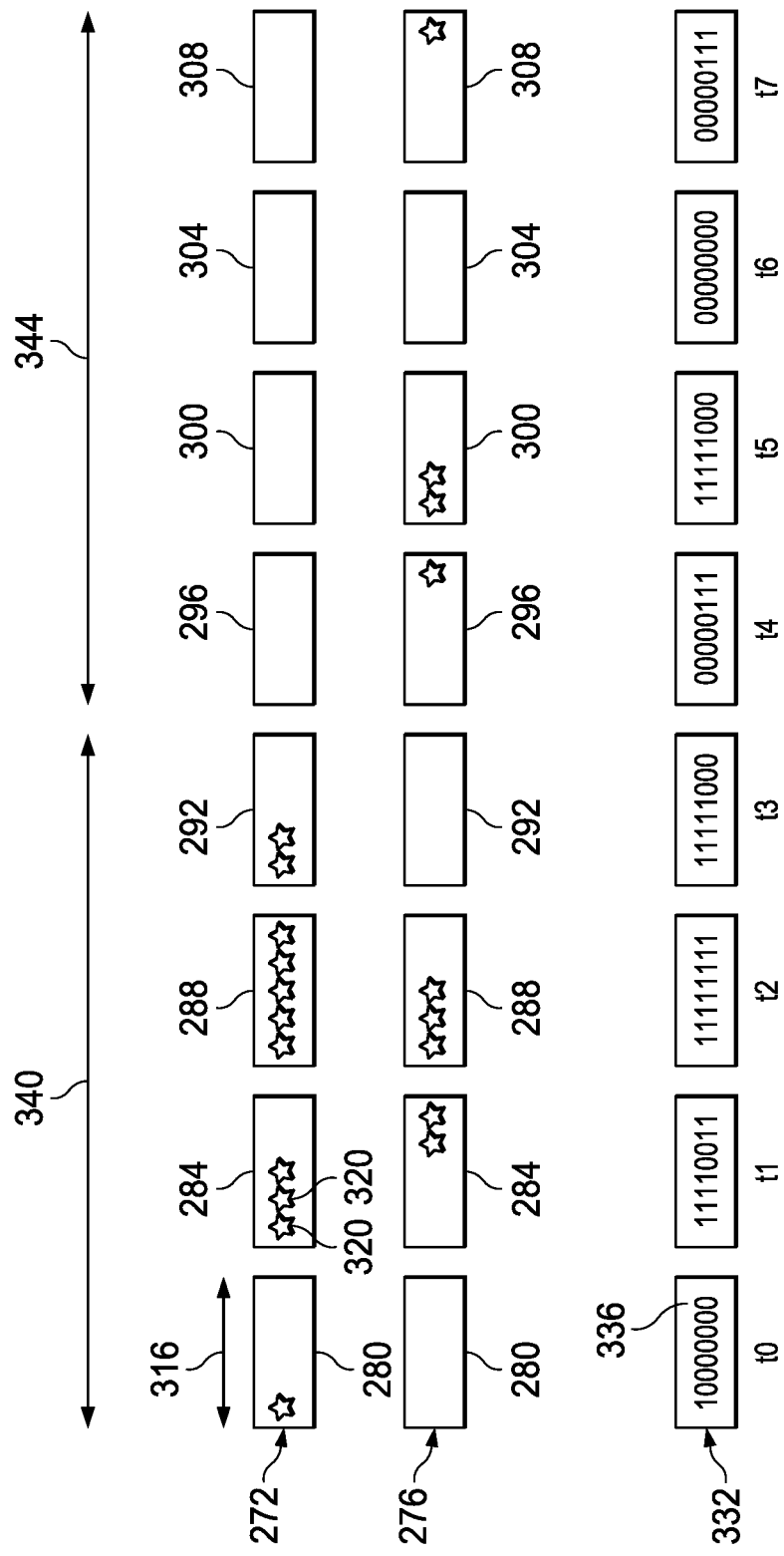
FIG. 7 is a schematic diagram of an illustrative embodiment of sensing records for two detector stations as an aspect of an illustrative embodiment of a system for monitoring the activities of livestock in a feedlot or other setting.

Referring now primarily to FIG. 7, a schematic diagram is presented that presents a smoothing and filtering functions within detector stations 116. In this figure, two detector stations 116 (a first detector station 272 and a second detector station 276) have an overlap zone, which is where both detection stations receive signals for the same asset tag. As a result, a particular asset tag 124 is detected by both stations when the asset tag is in the overlap zone. This may be shown by considering data for a number of sequential time periods.

Sequential time boxes 280, 284, 288, 292, 296, 300, 304, and 308 present data recorded for sequential time intervals. Each of the time boxes 280, 284, 288, 292, 296, 300, 304, and 308 are labeled at the bottom with the applicable time segment: $t_0$, $t_1$, $t_2$, $t_3$, $t_4$, $t_5$, $t_6$, $t_7$. While only eight are shown other segments may be used. Each time box represents a time window of a given duration, which may range from minutes to hours, e.g., 30 seconds, 2 minutes, 5 minutes, 10 minutes, 30 minutes, one hour, two hours, etc. Each time window may be referred to as an "era" 316. A star symbol is used to show asset tag encounters during the era 316, i.e., for a specific time box. Each star 320 within an era 316 represents an individual detection event of a specific animal's 120 presence, e.g., asset tag-A. In this example, within era 280 on the left of the figure, an asset tag-A 124 was detected once by the first detector station 272 but was not detected at all by the second detector station 276. This shown in the data recording by only have one star in time box 280 of the first station 272 and no stars in the time box 280 of the second station 276.

The asset tag-A was in the overlap zone in the next two times boxes, or eras, 284, 288. Thus, one can see that during the time period covered by eras 284 and 288, the asset tag was within the overlap zone—and so detected by both stations 272, 276—as shown by the stars therein. Furthermore, one can see that at era 280 ($t=t_0$), asset tag-A was only detected once by the first detector station 272, while at era 284 ($t=t_1$) and 288 ($t=t_2$) there were more consecutive detection events in both stations 272, 276.

The data developed by the two stations 272, 276 may be filtered and smoothed. The smoothing and filtering utilizes a detection threshold, which one can define as the minimum number of detection events that are required to occur within one era in order to determine that a positive detection has occurred for a given station 272, 276. As an example, if one considers the detection threshold to be three events, then the smoothing and filtering logic at the first station 272 would generate a detection notification only for eras 284 and 288, and at station 276 it would only generate a detection notification for era 288. As another example, note that while asset tag-A was detected at the second station 276 during era 296 ($t=t_4$), era 300 ($t=t_5$), and era 308 ($t=t_7$), during those times, if the detection threshold was set at three encounters, then it never exceeded the detection threshold to generate a detection notification for eras 296, 300, 308. That data may not be sent as it is considered spurious in some way. As another example, if the detection threshold is set at two, then, the first station 272 would report detections at eras 284, 288, and 292, and the second station 276 would report detection events at eras 284, 288, and 300. The threshold may be set at various event levels in different embodiments; for example, it may be 1, 2, 3, 4, 5, 6, or more.

To further increase the accuracy, the detection notification that is generated by the detector station, e.g., detector station 272 or 276, for a given era 316 may also include a granular time-based report—see the bottom row in FIG. 7. Reference is made to the final row in FIG. 7, but the row does not correlate with the rows above it other than having the same time scheme. The granular time-based report may be called a detection bitmap 332. Each bit 336 in the bitmap 332 represents a unit of time within the corresponding era 316. A value of "1" indicates that the asset tag 124 was detected within that time unit and a value of "0" indicates that the asset tag 124 was not detected within that time unit. By providing a granular report of detections per time-unit, algorithms that process the data can draw more accurate conclusions about animal behavior.

Consider the era at to, that era shows with the code "10000000" that for the station being reported for the time segment, which is broken into 8 units, there was a detection at the start and thus the code begins with a "1" but then had the remaining seven units with no detections.

To further elaborate, consider time units $t_3$ and $t_4$ in bottom row of FIG. 7. The first era $t_3$, represented by "11111000," started with five consecutive detections and was followed by three time units of no detection. The second era $t_4$, represented by "00000111," shows no detections for five units and then has three detections for the final three time units. The gap formed by thee no detections in era $t_3$ and five in era $t_4$ may be interpreted as the delineation between two distinct events. For example, the gap in detections may indicate two distinct drinking events whereby an animal drank for five consecutive time units, left for 8 consecutive time units, and then returned to drink again at the end of era $t_4$. Using a bitmap 332 to represent time units reduces the amount of data, and therefore wireless resources and power required to transmit the information. Various data compression algorithms may be used to further conserve wireless resources and power utilization as one skilled in the art would appreciate.

By aggregating detection events within an era, and by applying the detection threshold to filter out spurious or inconsequential detection events, the number of messages that are transmitted wirelessly from the detector station 116 to the gateway 176 are reduced, thereby conserving wireless resources and power, without sacrificing any of the motion estimation intelligence. However, the metadata associated with the filtering and smoothing also offers valuable insights into the behavior of a specific animal.

In one illustrative embodiment, in order to communicate the data from the detection station 116 to the asset management system 180 (FIG. 1), the system 100 may define the concept of an epoch and two epochs 340, 344 are shown at the top of FIG. 7. An epoch is a time period consisting of several consecutive era's 316. The epoch information may be used to efficiently communicate with the asset management system 180 (FIG. 1) via the gateway 176 (FIG. 1). The first epoch 440 includes eras 280, 284, 288, 292, and the second epoch 344 includes eras 296, 300, 304, and 308. In one illustrative embodiment, an era 316 may be defined as 1 hour, and an epoch 340, 344 as a collection 24 consecutive 1-hour eras. In this embodiment, the detection station, with its smoothing and filtering function, generates a report at the end of each epoch 340, 344 to inform the asset management system 180, or application management system, about how many times there were detection events during that epoch. It may report also how many did not meet the threshold criteria in some embodiments.

Figure 8:
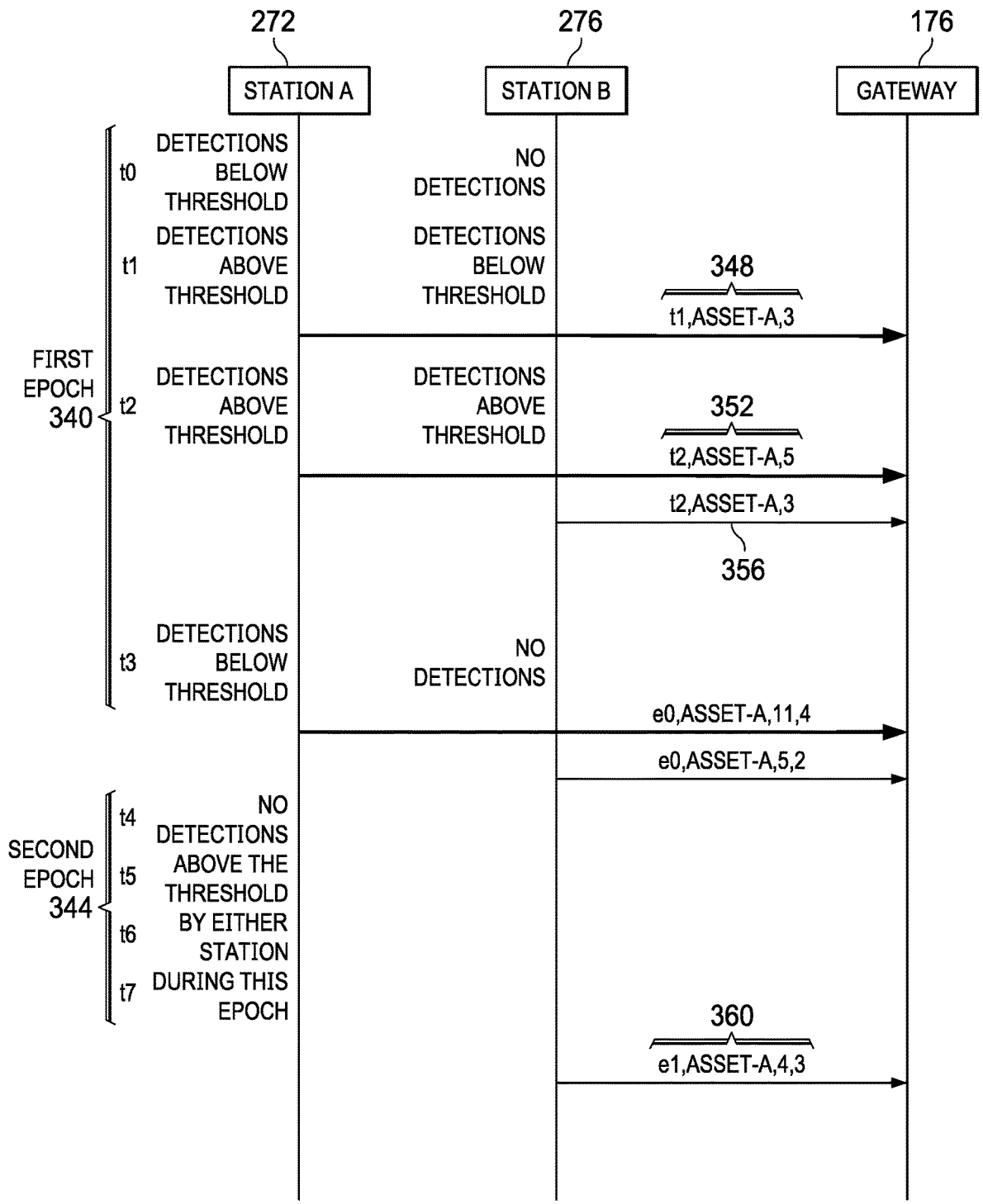
FIG. 8 is a schematic diagram of an illustrative embodiment of sensing records transmitted to a gateway.

Referring now primarily to FIG. 8 and to a lesser extent FIG. 7, a schematic representation of data transmitted to a gateway, e.g., gateway 176 (FIG. 1), from the two detection stations 272, 276, which have an overlap zone, is presented. FIG. 8 shows how the smoothing and filtering function may present data to the corresponding asset management system 180 (FIG. 1) using notification messages. The detection events and notifications in FIG. 8 correspond to the detection events illustrated in FIG. 7 for the two stations for the two epochs 340, 344 and their corresponding eras as shown in the top two rows.

For example, considering the vertical time indications shown in FIG. 8, at the end of to $t_0$, there is no notification made because the one detection made in era 280 at the first station 272 is below the threshold (assuming a threshold of three detection encounters for this example) and the second station 276 had no detections; consequently, there was no notification. At the end of $t_1$ (era 284), the report shows that the first detector station 272 (or station A) sends a notification 348 that the first detection station 272 detected the proximity of asset-A three times in era $t_1$. The second station 276 had no notification since the two detections are below the detection threshold.

At the end of $t_2$ (era 288 in FIG. 7) both the first station 272 (station A) and the second station 276 (station B) report that they have detected asset-A (since it is in an overlap zone). The notifications 352 for the first station 272 indicates five detection events, and the notification 356 for the second station 276 indicates three detection events. Similar reporting occurs for the other eras of the epoch 344. At the end of the first epoch 344 (also referenced as e0), a notification is sent from the first detector station 272 to the asset management system via the gateway 176 that during first epoch 344 (e0), asset tag A had a total of 11 detection events in four different eras, and the second detector station 276 sends a notification that asset tag A had a total of 5 detection events in two different eras.

Going to the data for the second epoch 344, no notification are sent at the end of $t_4$, $t_5$, or $t_6$ because either there were not detections or the detection events were below the detection threshold. At the end of the second epoch 344, a notification 360 is sent that for the second epoch 344 (also referenced as e1), asset tag A was detected four times in three eras.

It should be noted that FIG. 8 shows both the first station 272 and the second station 276 communicating directly to the gateway 176, but in some embodiments, one station may communicate to the other and that station communicates only once for both stations to the gateway. Moreover, in some embodiments, the stations may alternate who communicates or it may be based on who has more power in their respective batteries.

The system 100 performance in terms of sensitivity, accuracy, timeliness and efficiency can be tuned by selecting different values for the concepts that are described in this disclosure. The following table provides a summary of those values which may be readily controlled by the configuration settings in one illustrative embodiment: era, epoch, and detection threshold.

TABLE 1

| Parameter | Description |
| --- | --- |
| Era | A window of time, or interval, during which detection events from the proximity sensing layer (detection station) are aggregated |
| Epoch | A collection of consecutive eras for which periodic aggregate statistics are reported for the asset management system |
| Detection Threshold | The minimum number of detection events that must be present from the proximity sensing layer (detection station) within a given era in order to produce a detection notification |

The ability to synchronize the clocks of the various detector stations 116 and gateways 176 is a consideration. This is for two main reasons. First, synchronization enables correlation and de-duplication of detection events from different detector stations 116, Second, it enables coordination and use of different transmission windows among the various detector stations in order to minimize interference, collisions and retransmissions. Thus, synchronization may ultimately result in more effective use of limited wireless resources and more power efficiency.

While power efficiency at the detector stations 116 is significant due to the fact that in most cases the detector stations 116 are battery powered, the detector stations 116 should be sufficiently supplied to be able to support GPS time synchronization, which is a preferred and simplest time synchronization approach. With such synchronization, given a sufficiently large time window used for an era (which typically range from minutes to hours), it is sufficient for the precision requirement between the different detector stations 116 to be less stringent. Such reduced precision allows for time synchronization to be achieved by means of a message exchange between the detector station 116 and the gateway 176. An approach to achieve this in the LoRa environment has been described by the LoRa Alliance in the LoRaWAN Application Layer Clock Synchronization Specification, which describes clock synchronization messages exchanged between a LoRa node and gateway for this purpose and is known by those skilled in the art. Similar approaches can be used for other wireless protocols.

With their clocks synchronized, all detector stations 116 can use the same era and epoch identifiers when sending messages to the application management system 180 in the uplink direction. As described above, it is likely that there will be some degree of overlap between the detection zones of adjacent detector stations 116 that may result in duplicate detections as illustrated in FIG. 7. While this may not be an issue from an asset management system 180 perspective, transmitting a message (or notification) from the detector station 116 to the gateway 176 only for the message to be discarded further down the processing chain is a waste of wireless resources and power. The system may be configured to avoid such results.

Figure 9:
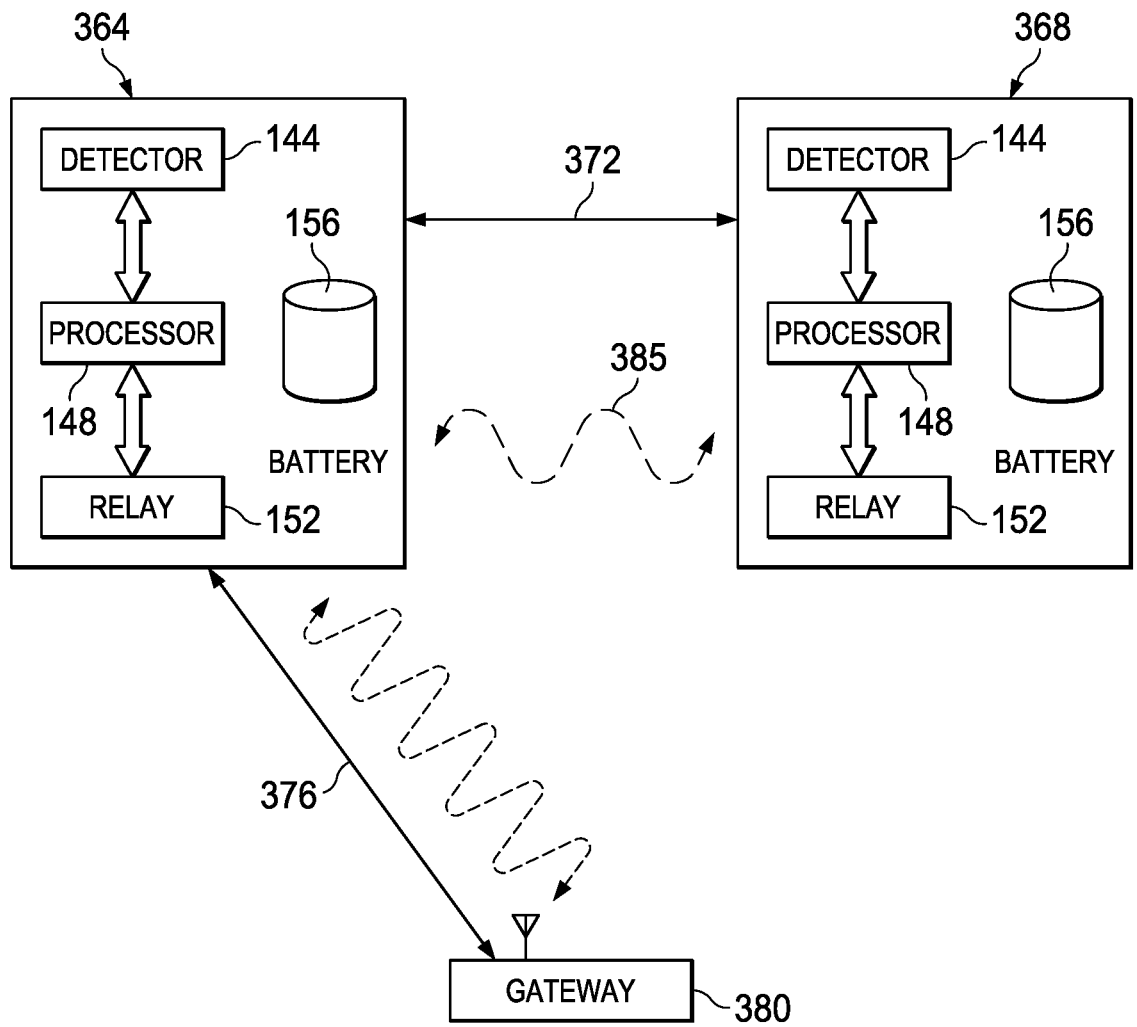
FIG. 9 is a schematic diagram of a portion of an illustrative embodiment of a system for monitoring the activities of livestock in a feedlot or other setting showing aspects of a mesh network.

Referring now primarily to FIG. 9, an illustrative system is shown with two detector stations: a first detector station 364 and a second detector station 368. In this situation, there may be duplicate detection notifications unless steps are taken. Note that overlap only occurs between adjacent detector stations in relatively close proximity to each other (on the order of several meters). The first detection station 364 is separated by a distance 372 from the second detection station 368. This contrasts to the distance 376 between the first detector station 364 and an illustrative gateway 380, which is much further away (e.g., potentially on the order of several hundred meters). In this arrangement, the detector stations 364, 368 would consume more battery power to communicate with the gateway 380 than with each other. This distance disparity can be addressed by forming a low-power mesh network between the adjacent detector stations 364, 368 that can be used to perform message de-duplication at the edge, as referenced in FIG. 10.

Figure 10:
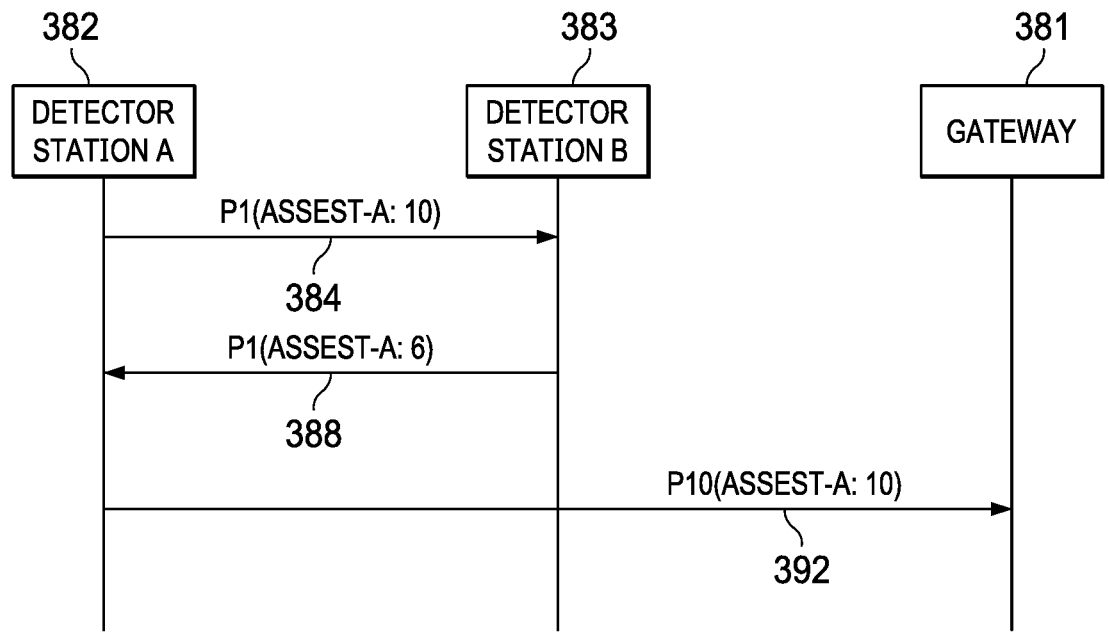
FIG. 10 is a schematic diagram presenting interaction between adjacent detector stations and a gateway according to one illustrative embodiment.

Referring now primarily to FIG. 10, a schematic presenting de-duplication of notifications is presented. Before relaying a detection event to the gateway 381 (380 in FIG. 9) at the end of an era, the detection stations 382 (364 in FIG. 9), 383 (368 in FIG. 9) use the low power mesh network 385 (FIG. 9) to exchange information about the detections for each asset tag within that era as illustrated by the first two messages at 384, 388. The messages are denoted as P1 to indicate that they require 1 unit of power to transmit.

In one illustrative embodiment, the detector station with the largest number of detections for a given asset tag within an era is elected as the primary detector and relays the detection notification to the gateway 381, as illustrated by the third message 392. The message 392 is denoted as P10 to indicate that it requires 10 units of power to transmit due to the significantly larger distance (see 376 in FIG. 9). This is just one example. Other techniques that may be used to elect the primary detector include but are not limited to using the first to detect as the primary, using the one with the strongest RSSI as the primary, assigning different priorities to different detector stations, alternating stations on a pattern, measuring battery remaining, one with the strongest backhaul signal, the one with the most reliable link, etc.

Continuing the above example, the first detector station 382 (station A) has incurred an overhead of 10% in relaying the detection event to the gateway 381 because the first detector station 382 expended the additional 1 unit of power to inform the adjacent detector station. The second detector station 383 (station B) has realized a power saving of 90% since the second detector station 383 avoided having to send a high-energy signal to the gateway 381 for the given interval.

The overall gain in power efficiency at a specific detector station depends on the ratio of duplicate detections and the number of notifications sent over the mesh network 385. Additional intelligence can be implemented within the detector station 382, 383 to only inform adjacent detector stations when there is a reasonably high probability that a given asset tag was also detected by that station as will be presented next.

Figure 11:
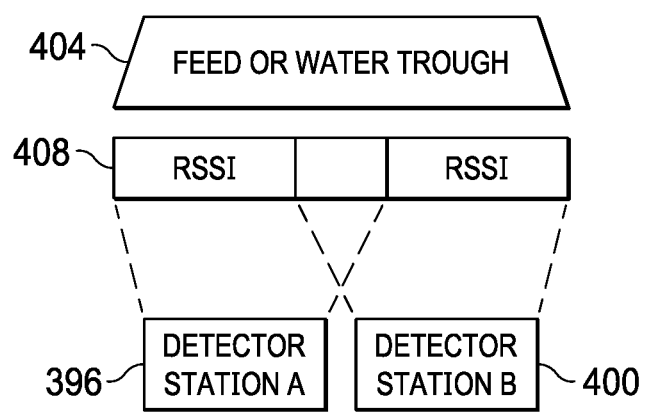
FIG. 11 is a schematic diagram of a feed or water trough of an illustrative embodiment of a system for monitoring the activities of livestock in a feedlot or other setting showing two adjacent detector stations.

Referring now primarily to FIG. 11, one illustrative approach to minimize or reduce messages on the mesh network is presented. This illustrative embodiment shows two detector stations 396, 400 using RF technology such as RFID or BLE as the proximity sensing technology near a feed trough or water trough. The received signal strength indicator (RSSI) 408 of the detected asset varies depending on the asset's location within the detection field, or detection zone. The first detector station 396 can use this information to decide whether the first detector station 396 needs to inform its neighboring detection station, the second detector station 400, of a detection event by using the RSSI as a predictor of the probability that the asset was also within the detection zone of an adjacent detector station. The RSSI is proportional to the distance between the asset tag and the detector/reader antenna. If the RSSI is below a certain value that can be either fixed or automatically adjusted based on recent detections, it may be assumed that the asset tag 124 may also be near an adjacent detector station 116.

In another embodiment, if the detector stations 396, 400 can detect bearing and can be calibrated to know that when an asset tag has been recorded in a certain range for the bearing, there is a likelihood of overlap, but otherwise not.

Programmed steps may be used with the detected presence of asset tags by detector stations to determine how long an animal 120 has been drinking or eating as well as movements over time intervals. These steps may be done at the detector station 116 level by the microcomputer 148 (FIG. 3) and resultant information transmitted to the gateway or may be done on the data by the asset management system 180 (by a microcomputer—see 492 and memory 500 in FIG. 14). An example will now presented by first establishing a framework in FIG. 12 and then process flow for the steps in FIG. 13 for one illustrative embodiment.

Figure 12:
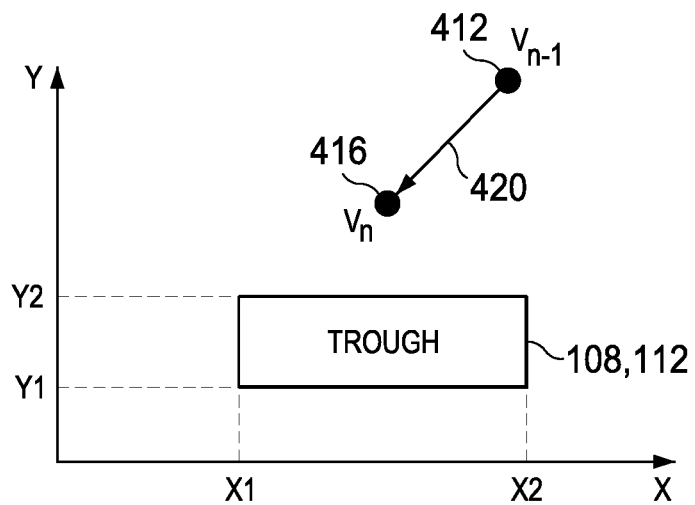
FIG. 12 is a schematic diagram of a trough positioned in a cartesian plane or X-Y graph and showing movement of an asset tag towards the trough.

Referring now primarily to FIG. 12, a trough 108, 112, which may be a feed trough 108 or a water trough 112, is presented on an cartesian/X-Y space. The four corners are (x1, y1), (x2, y1), (x2, y2), and (x1, y2). For this illustration, uppercase and lower case letters are used interchangeably. An asset tag 124 is shown at a first position 412 and then having moved to a second position 416 to define a vector 420. This may interpreted as the animal wearing the asset tag 124 is approaching the trough 108, 112. This framework is used for reference with the next figure.

Figure 13:
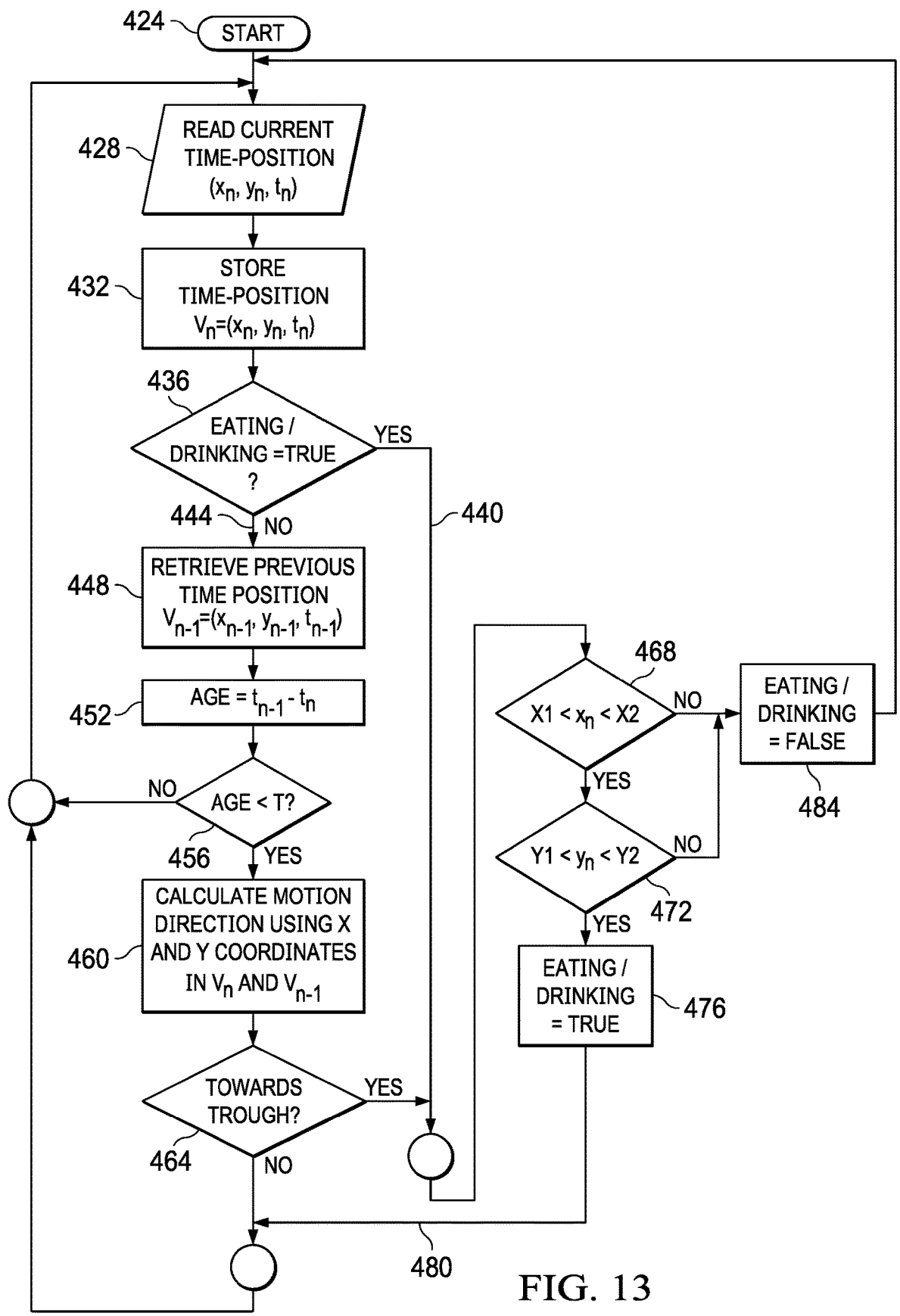
FIG. 13 is an illustrative process flow diagram of a process that may be used to identify movement of an asset tag by a detector station or other processor.

Referring now primarily to FIGS. 12 and 13, and initially to FIG. 13, a schematic process flow chart for the process of determining movement and monitoring of an asset tag 124 is presented. The process starts at 424 and proceeds to read/detect the position at a current time as shown at input 428. The input is then stored at step 432 as $V_n=(X_n, Y_n, t_n)$. That is, the X-Y position is saved for a time t. At interrogatory box 436 the process asks if a flag has been set to eating or drinking; that is if an eating or drinking flag been set to "true" elsewhere in the process. If true, the process continues on path 440, and if not, the process continues on path 444.

If negative, i.e., on path 444, the process will retrieve the previous position data, i.e., $V_{n-1}=(X_{n-1}, Y_{n-1}, t_{n-1})$ at 448 and then calculates the time difference between the present and the previous time at box 452 to determine the elapsed time, or age. Moving to interrogatory box 456, if the age is less than a max limit time, T, the process continues to box 460 and otherwise (if negative) goes back to input 428 for continued monitoring. If the data current enough, the system will check the motion and otherwise it will just continue monitoring. In some embodiments, the maximum time (T) is 30 seconds, 1 minute, 2 minutes, 3 minutes, 4 minutes, 5 minutes, or anything therebetween. Other times may be used as well.

If not aged out, i.e., age<T, at box 460, the motion direction of the asset tag is calculated. This calculation includes a direction. The angle from a reference in the cartesian plane may be calculated for a vector and that used with a look-up table to determine if the direction is towards or away from the trough or alternatively the vector can be extrapolated to see if it hits the trough zone. For example, with reference to FIG. 12, for an asset tag at position 412 any vector at an angle in the range of about 225 to 270 degrees (where 3 pm on a clock face would be zero and measurement goes counterclockwise) would be toward the trough 108, 112.

At interrogatory box 464, the process considers whether the movement is towards or away from the trough 108, 112. If away from the trough 108, 112, the system will continue to monitor and goes back to input 428. If toward the trough 108, 112, the process continues to interrogatory box 468 where the process of determining if the asset tag 124 is at the trough is considered.

Determining if the asset tag is at the trough 108, 1112 is done first at interrogatory box 468 by asking if the x position is in the trough zone (i.e, between $x_1$ and $x_2$) and if so then asking at interrogatory box 472 whether the current y position is in the trough zone (i.e, corresponds with the trough with respect to y) at interrogatory box 472. If interrogatory boxes 468 and 472 are both true, the "eating" or "drinking" flag is assigned as "true" at box 476 and the process then goes back to input 428 as shown by path 480. The process will be set for each trough and will know if the flag is for eating or drinking, but for purposes of explaining both are referenced here. If either interrogatory boxes 468 or 472 is negative, then the process goes to step 484 and the process assigns "false" to the eating or drinking flag and the process continues to input 428. This is one approach, but those skilled in the art will appreciate that many approaches may be used with the developed data from the system 100.

Referring now primarily to FIG. 14, a schematic representation of a representative example of hardware components of a programmable computer 488 that may be used as or with the asset management system 180 (FIG. 1) or other computers referenced herein is presented. A computer 488 comprises one or more processors, generally represented by processor 492, which comprise a CPU, for reading and executing instructions. Steps for carrying out the processes are encoded in one or more sets of instructions, or programs.

The computer 488 includes a processor 492. The processor is representative of implementations having one or more central processing units (CPUs), a graphics processing unit (GPU), other types of processors, and combinations of CPUs, GPUs, and other types of processors. The processor 492 may communicate with a main or working memory 496 and a storage memory 500 over one or more buses represented by bus 504. The main or working memory is intended to be generally representative of short-term memory used by the processor for storing instructions being executed and other data being processed, such as random access memory (RAM), including cache memory. Storage memory is representative of longer-term memory for storing program instructions and data structures, such as hard disks and solid-state disks. Bus 504 is intended to be representative of all types of bus architectures and other circuits for enabling communication between the processor 492 and other components of the computing machine.

The computer 488 may also be connected with other hardware to form a computing system or to implement a special purpose device that utilizes the computer's processing for control, communication, or other functions. For example, if intended to interact with a person, it may communicate with a user through visual display 508. Examples of visual displays include monitors such as CRT (Cathode Ray tube), LCD (Liquid Crystal Display), LED (Liquid Emitting Diode), OLED (Organic Light Emitting Diode), Plasma Monitorliquid crystal displays, projectors, and other devices for creating visually perceptible images. The computer may also include one or more devices for enabling a user to enter information, control, and interact with the computing machine and a graphical user interface presented on the visual display. These are collectively designated 512 and may include, for example, depending on the computing machine, a keyboard, a mouse or track pad, a touchscreen, a microphone, and similar devices for providing interaction. A media reader 516 for reading removable media, such as an optical disk drive that reads optical media or a memory card reader, enables the computing machine to read data from and/or write data to removable data storage media. Those skilled in the art will appreciate that other components may be used.

The computer may also communicate with other types of other input and output devices through various type interfaces. These devices are generally designated 520. Examples include cameras, a Global Positioning System (GPS) receiver, and environmental sensors, such as temperature, light, and acoustic sensors, accelerometers, and gyroscopes. To communicate with other computers (or devices in which computers have been embedded), the computer may be connected to one or more network interfaces 524 that enables the computing machine to communicate with other computers and devices using known networking protocols. The network interfaces may be wired, optical, or wireless.

Program instructions to executed by the processor and data structures written or read by such processes, are stored on machine or computer readable media. Examples of such computer readable media include, but are not limited to, working memory 496, storage memory 500, as well as removable media being read by reader 516. While the machine-readable medium in the example embodiment can be a single medium, the terms machine readable medium and computer readable medium are generally intended to also include, unless the context clearly indicates otherwise, multiple media, and can be centralized or distributed among several computing machines.

A processor can be a microprocessor, a special purpose processor, or a combination of one or more processors of the same or different types. A few examples of machines or devices comprising or containing programmable computers include mainframe computers, mini computers, personal computers (PC), web appliances, network routers, switches, bridges, hardware firewalls, mass data storage devices tablet computers, set-top boxes, smartphones, personal digital assistants (PDA), and cellular telephones. As with other lists herein, the foregoing list is not to be limiting. Furthermore, multiple computers may implement a process, each performing only a part of the process, or a separate instance of the process.

The term "non-transitory machine-readable medium" or "non-transitory memory" means any tangible medium or media, but not transitory signals, that is capable of storing, encoding, or carrying instructions for execution by the computing machine and that cause the computing machine to perform any one or more of the processes described below, or that is capable of storing, encoding, or carrying data structures used by or associated with such instructions. Examples of non-transitory machine-readable media include, but are not limited to, nonvolatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks. Other forms of memory may be used. The memory may be referred to as non-transitory machine-readable storage medium at times.

Although not illustrated, most programmable computers have an operating system. An operating system (OS) is set of computer programs that manage computer hardware and software resources and provides common services for application and other programs that are executed by the computer. As explained below, a single hardware computer can be used to support multiple, separate virtual computing environments for supporting execution of a software application. Processes described below can be programmed as an application and executed directly by a hardware computer or in a virtualized environment.

A programmable computer may be embedded into a special purpose device for providing the logic for controlling the device or extending its functionality and include, or be combined with, a number of other elements, including ports for connecting, for example, keyboards and visual displays to allow a person to interact with the computer, and network interfaces for allowing the computer to communicate with other computers over a network. Examples of computers include desktop and laptop computers, computers that act as servers, routers, switches, mobile devices, embedded computing systems, and any type of machine with one or more central processing units for executing instructions to perform programmed processes. Those skilled in the art will appreciate that many computer systems may be used for the microcomputers referenced herein.

According to one illustrative embodiment, an approach that applies passive asset tags such as RFID tags for the purposes of: position determination and motion determination of cattle in a feedlot; determination of whether or not the cow is eating or drinking in the feedlot according to the cow's position in the feedlot over time; and determination from additional information acquired from a passive sensor, such as through a low-power accelerometer, that the cow is eating or drinking.

According to one illustrative embodiment, a livestock or cattle asset management system that can monitor and ascertain the consumption of feed and water by animals over a multiplicity of feedlots is presented. The asset management system 180 (FIG. 1) can process data for multiple feedlots.

In one illustrative embodiment, detector stations 116 are deployed about the troughs 108, 112. Two stations may be positioned at each trough 108, 112 within 1-2 meters throughout the feedlot 104. The detector stations 116 broadcast a radio signal that provides energy for a return from the RF asset tags 124 on the livestock. The livestock have the asset tags 124 attached, typically with an ear-tag placed in the ear of each livestock and each having a unique asset code. The detector stations 116 communicate with the gateway 176 that communicates with the asset management system 180. Each detector station 116 can broadcast constantly or be pulsed in a coordinated (synchronized) fashion to avoid interference. The processor and non-transitory memory of the detector stations 116 may cause the detector station to read the asset tags that come within range and coordinate with other nearby stations to reduce data transmitted. The detector stations filters and reduces data transmission.

The detector stations 116 filter by requiring the presence of an asset tag more than a threshold number of times for a time period in order to act on the detected asset tag. The detector stations 116 can reduce data by only transmitting for one station where multiple stations have received signals in the detection area of the detector station. See FIG. 10.

The kinds of data monitored by the asset management system 180 include total time at water trough 108, feed trough 112, and movement calculated by presence at different stations 116 for a time period, e.g., 24 hours period. The asset management system 180 can compare the recorded or determined values for each livestock with performance standards and alert management personnel concerning the livestock that are outside of the standards. The alerts can been acted upon based on severity. If for example, the standard is to drink at a water trough for at least 15 minutes every 24 hours, and livestock number ABC has not had any water, a pushed alert can be sent to management that livestock number ABC is in a crises condition. This same kind of alert can be established for each variable—food, water, movement. Other features can be built in such as asking the asset management to locate a particular livestock. In that case, it can search the position records sent and provide the most recent location for that particular livestock.

There are many illustrative embodiments of the disclosure. Many have been referenced above and some other examples follow.

Example 1. A system for monitoring the activity of a plurality of livestock in a feedlot, the system comprising:
a plurality of asset tags for coupling to the plurality of livestock to be monitored, each asset tag having a unique identifier;
a plurality of troughs for feeding or watering;
a plurality of detector stations positioned proximate to the plurality of troughs;
a gateway for receiving signals from the plurality of detector stations, wherein the signals provide information on each of the plurality of asset tags as sensed by the plurality of detector stations; and
an asset managing management system comprising a processor and memory for executing instructions to determine and monitor activities of the plurality of livestock, wherein the asset management system receives signals from the gateway over a network.

Example 2. The system of Example 1, wherein the plurality of asset tags comprises passive RF tags.

Example 3. The system of Example 1, wherein the plurality of asset tags comprises active tags.

Example 4. The system of Example 1, wherein the plurality of asset tags comprises tags with visual identifiers and the plurality of detector stations comprise a plurality of cameras for reading the visual identifiers.

Example 5. The system of Examples 1 or 2, wherein adjacent members of the plurality of detector stations form a mesh network.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A feedlot asset-tag system for monitoring a plurality of animals in a confined space having at least one water trough and at least one feed trough, the feedlot asset-tag system comprising:
a plurality of RF asset tags attached to the plurality of animals, wherein each of the plurality of RF asset tags comprises a non-volatile memory having a unique identifier code that is transmitted when the RF asset tag is energized by a radio signal;
a plurality of RF detector stations, wherein at least one of the plurality of RF detector stations is positioned at least within 10 meters of the at least one water trough and wherein at least one of the plurality of RF detector stations is positioned within 10 meters of the at least one feed trough, wherein the RF detector is configured to transmit a radio signal to any of the plurality of RF asset tags within a detection zone for that RF detector and receive a returned signal with the unique identifier code, and wherein each of the plurality of RF detectors has a detector-station processor and a detector-station memory, which is a non-transitory memory, for executing programmed code;
an asset management subsystem comprising a management processor and management memory, wherein the management memory is a non-transitory memory;
a communication link for communicating signals from the plurality of RF detector stations and to the asset management subsystem;
wherein for each of the plurality RF detector stations, the detector-station processor and the detector-station memory include programming to receive a returned signal with the unique identifier code from any RF asset tags in its detection zone and transmit the unique identifier code using the communication link to the asset management subsystem; and
wherein, for a member of the plurality of RF detector stations, the detector-station memory comprises stored instructions, which when executed by the detector-station processor, cause the detector-station processor to:
read the current position of a member of the plurality of RF asset tags in the detection zone of the member of the plurality of RF detector stations,
store the current position,
check if an eating or drinking flag is true, and
if true continue to check based on the current position to see if the RF asset tag is within a trough zone, and if so, continue the flag as true and otherwise change the flag to false.

2. The feedlot asset-tag system of claim 1, wherein at least one of the plurality of RF detector stations is positioned at least within 5 meters of the at least one water trough and wherein at least one of the plurality of RF detector stations is positioned within 5 meters of the at least one feed trough.

3. The feedlot asset-tag system of claim 1, wherein at least one of the plurality of RF detector stations is positioned at least within 1.5 meters of the at least one water trough and wherein at least one of the plurality of RF detector stations is positioned within 1.5 meters of the at least one feed trough.

4. The feedlot asset-tag system of claim 1, wherein the detector-station memory comprises stored instructions, which when executed by the detector-station processor, cause the detector-station processor to only transmit detections of RF asset tag detections greater than a detection threshold for a given time period.

5. The feedlot asset-tag system of claim 1, wherein adjacent members of the plurality of RF detector stations communicate with one another and only send one signal with data over the communication link to the asset management subsystem to save energy for one of the adjacent members.

6. The feedlot asset-tag system of claim 1, wherein each of the plurality of RF detector stations comprises a synchronization clock and each of the plurality of RF detector stations is programmed to transmit at unique times to avoid interference.

7. The feedlot asset-tag system of claim 1, further comprising a gateway, and wherein the communication link comprises wireless communication to the gateway and wireless communication from the gateway to the asset management subsystem.

8. The feedlot asset-tag system of claim 1, wherein each of the plurality of RF asset tags comprises a micromechanical accelerometer.

9. The feedlot asset-tag system of claim 1, wherein at least three members of the plurality of RF detector stations are positioned within 10 meters of a water trough or feed trough and each of the at least three members develops a range measurement for each detected member of the plurality RF asset tags within the RF detector station's detection zone and wherein the range measurement of each of the at least three members is shared amongst the at least three members, and the detector-station processor and detector-station memory for each is operable to determine where range arcs based on the range measurement overlap to arrive at a location for a detected asset tag.

10. The feedlot asset-tag system of claim 1, wherein each of the plurality of RF detector stations is configured to record asset detection events for a time period, which is an era, and transmit detection events at the conclusion of a pre-defined number of eras known as an epoch.

11. The feedlot asset-tag system of claim 1, wherein adjacent members of the plurality of RF detector stations comprise a mesh network for communicating between the adjacent members.

12. The feedlot asset-tag system of claim 1, wherein the stored instructions cause the detector-station processor to:
check if an eating or drinking flag is true at a first decision point,
if the flag at the first decision point is not true, then retrieving a previously recorded position of the RF asset tag and calculating an elapsed time since that previously recorded position and the current position, and if the elapsed is less than a maximum, calculating a direction between the previously recorded position and the current position, and
if the direction is towards the trough, checking to see if the current position is at the trough and otherwise reading a position of the RF asset tag again.

13. A method for monitoring the activity of a plurality of livestock in a feedlot, the method comprising:
attaching a plurality of RFID asset tags to the plurality of livestock to be monitored, each RFID asset tag having a unique identifier that is transmitted in response to an energizing signal from a detector station;
positioning a plurality of detector stations in the feedlot, each detector station comprising an RF reader, wherein at least one of the plurality of detector stations is positioned proximate to at least one water trough, and wherein at least one of the plurality of detector stations is positioned proximate to at least one feed trough, wherein each of the plurality of detector stations comprises a detector-station processor and a detector-station memory, and wherein each detector station of the plurality of detector stations has a detection zone in which the detector station can read RF asset tags;
providing a gateway that receives signals from the plurality of detector stations;
providing an asset management system comprising a management processor and management memory, wherein the asset management system receives signals from the gateway over a network;
recording detection events for each detector station of the plurality of detector stations and determining the location of each detection event;
transmitting detection event data to the asset management system;
determining motion vectors for each of the plurality of RF asset tags; and
monitoring the status of movement, drinking, and eating behavior of the plurality of livestock using the motion vectors, wherein monitoring the status of movement, drinking, and eating behaviors of the plurality of livestock using the motion vectors includes using speed and direction information of the motion vectors to determine feeding or drinking start events or feeding or drinking stop events for each of the plurality of livestock;
recording time intervals that each RF asset tag is in a water trough zone for the at least one water trough or a feed trough zone for the at least one feed trough; and
wherein transmitting detection event data comprises assigning a one or zero for a feeding or drinking event at the at least one water trough or at least one feed trough and an opposite either one or zero for absence at the at least one water trough or at least one feed trough and sending a bit message of ones and zeros representing feeding or drinking events or an absence thereof.

14. The method of claim 13, wherein positioning a plurality of detector stations comprises positioning at least one member of the plurality of RF detector stations within 5 meters of the at least one water trough, and wherein positioning a plurality of detector stations comprises positioning at least one member of the plurality of RF detector stations within 5 meters of the at least one feed trough.

15. The method of claim 13, wherein transmitting detection event data to the asset management system comprises transmitting signals to a gateway and transmitting from a gateway to the asset management system.

16. The method of claim 13, wherein transmitting detection event data to the asset management system comprises transmitting signals to a gateway and transmitting from a gateway to the asset management system and further comprises developing an alert signal if the detection events are outside of an acceptable data range.

17. The method of claim 13, wherein each of the plurality of detector stations transmits at different times to the asset management system.

18. A feedlot asset-tag system for developing data concerning a plurality of animals in a confined space having at least one water trough and at least one feed trough, the feedlot asset-tag system comprising:
a plurality of RF asset tags attached to the plurality of animals, wherein each of the plurality of RF asset tags comprises a non-volatile memory having a unique identifier code that can be transmitted when the RF asset tag is energized by a radio signal;
a plurality of RF detector stations, wherein at least one of the plurality of RF detector stations is positioned at least within 3 meters of the at least one water trough and wherein at least one of the plurality of RF detector stations is positioned within 3 meters of the at least one feed trough, wherein the RF detector is configured to transmit a radio signal to any of the plurality of RF asset tags within a detection zone for that RF detector and receive a returned signal with the unique identifier code, and wherein each of the plurality of RF detectors has a detector-station processor and a detector-station memory, which is a non-transitory memory, for executing programmed code;
an asset management subsystem comprising a management processor and management memory, wherein the management memory is a non-transitory memory;
a communication link for receiving transmitted signals from the plurality of RF detector stations and delivering the transmitted signal to the asset management subsystem; and wherein for each of the plurality RF detector stations, the detector-station processor and the detector-station memory include programming to receive a returned signal with the unique identifier code from any RF asset tags in its detection zone and transmit the unique identifier code using the communication link to the asset management subsystem;

wherein the detector-station memory comprises stored instructions, which when executed by the detector-station processor, cause the detector-station processor to only transmit detections of RF asset tag detections above a detection threshold for a given time period;

wherein adjacent members of the plurality of RF detector stations communicate with one another and only send one signal with data over the communication link to the asset management subsystem to save energy for one of the adjacent members;

wherein each of the plurality of RF detector stations comprises a synchronization clock and the plurality of RF detector stations are programmed to transmit at unique times to avoid interference;

further comprising a gateway, and wherein the communication link comprises wireless communication to the gateway and wireless communication from the gateway to the asset management subsystem; and wherein, for a member of the plurality of RF detector stations, the detector-station memory comprises stored instructions, which when executed by the detector-station processor, cause the detector-station processor to read the current position of a member of the plurality of RF asset tags in the detection zone of the member of the plurality of RF detector stations, store the current position, check if an eating or drinking flag is true, and if true continue to check based on the current position to see if the RF asset tag is within a trough zone, and if so, continue the flag as true and otherwise change the flag to false.

* * * * *